United States Patent
Narayanaswamy et al.

(10) Patent No.: US 11,636,124 B1
(45) Date of Patent: Apr. 25, 2023

(54) INTEGRATING QUERY OPTIMIZATION WITH MACHINE LEARNING MODEL PREDICTION

(71) Applicant: Amazon Technologies, Inc., Seattle, WA (US)

(72) Inventors: Balakrishnan Narayanaswamy, San Jose, CA (US); Gokul Soundararajan, San Jose, CA (US); Jiayuan Chen, Menlo Park, CA (US); Yannis Papakonstantinou, La Jolla, CA (US); Vuk Ercegovac, Campbell, CA (US); George Constantin Caragea, Redwood City, CA (US); Sriram Krishnamurthy, San Francisco, CA (US); Nikolaos Koulouris, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 17/105,201

(22) Filed: Nov. 25, 2020

(51) Int. Cl.
*G06F 16/00* (2019.01)
*G06F 16/2458* (2019.01)
*G06F 16/2453* (2019.01)
*G06K 9/62* (2022.01)
*G06N 20/00* (2019.01)
*G06F 16/28* (2019.01)

(52) U.S. Cl.
CPC .... *G06F 16/2465* (2019.01); *G06F 16/24544* (2019.01); *G06F 16/283* (2019.01); *G06K 9/6257* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,127,467 B2* | 10/2006 | Yalamanchi | G06F 16/86 |
| | | | 707/999.102 |
| 9,406,027 B2* | 8/2016 | Luo | G06F 16/901 |
| 11,216,580 B1* | 1/2022 | Holboke | G06F 16/256 |
| 2018/0314735 A1* | 11/2018 | Liu | G06F 16/24532 |
| 2019/0354621 A1* | 11/2019 | Wang | G06F 16/2453 |
| 2020/0176121 A1* | 6/2020 | Dalal | G06N 3/08 |
| 2021/0174238 A1* | 6/2021 | Song | G06F 16/2465 |
| 2021/0248136 A1* | 8/2021 | Panuganty | G06F 16/2453 |
| 2021/0398015 A1* | 12/2021 | Fogal | G06N 20/00 |
| 2022/0083548 A1* | 3/2022 | Thiyagarajan | G06F 16/2393 |

(Continued)

OTHER PUBLICATIONS

U.S. Appl. No. 16/452,385, filed Jun. 25, 2019, Gaurav Saxena, et al.

(Continued)

*Primary Examiner* — Jean M Corrielus
(74) *Attorney, Agent, or Firm* — Robert C. Kowert; Kowert, Hood, Munyon, Rankin & Goetzel, P.C.

(57) ABSTRACT

A database system may include a machine learning model which may be used to perform various data analytics for data stored in the database system. In response to a request to invoke the machine learning model to generate a prediction from data stored in the database system, the database system may perform one or more optimization operations, as part of a query plan, to prepare the data to make it suitable for use by the machine learning model.

20 Claims, 16 Drawing Sheets

(56) References Cited

U.S. PATENT DOCUMENTS

2022/0121633 A1\* 4/2022 Quader ................. G06F 16/213
2022/0179910 A1\* 6/2022 Bharathy ................. G06N 3/08

OTHER PUBLICATIONS

Sergey Melnik, et al., "Dremel: Interactive Analysis of Web-Scale Datasets", Proceedings of the VLDB Endowment 3, No. 1-2 (2010): pp. 330-339.
U.S. Appl. No. 17/105,214, filed Nov. 25, 2020, Balaskrishnan Narayanaswamy, et al.
U.S. Appl. No. 17/105,226, filed Nov. 25, 2020, Balaskrishnan Narayanaswamy, et al.

\* cited by examiner

INTEGRATING QUERY OPTIMIZATION WITH MACHINE LEARNING MODEL PREDICTION

BACKGROUND

A data warehouse is an information repository system for data analytics. The data warehouse may include one or more databases. However, unlike a typical database system which is designed mainly to record data, the data warehouse is specially designed to analyze data. When data is ingested, it is stored in the one or more databases of the data warehouse. When data analytics is requested, query tools of the data warehouse access the data to perform analysis. The data analytics can involve applying science and computing technology to vast amounts of data to yield valuable insights. Example use cases include predictive modeling, portfolio analysis, fraud scoring, churn analysis, medical diagnostics, and so on. Machine learning is an efficient tool to perform various data analysis. It uses analytical models to learn from data, identify patterns, and make decisions with minimal human intervention. Therefore, it is desirable to have a data warehouse with integrated machine learning capabilities.

Figure 1A:
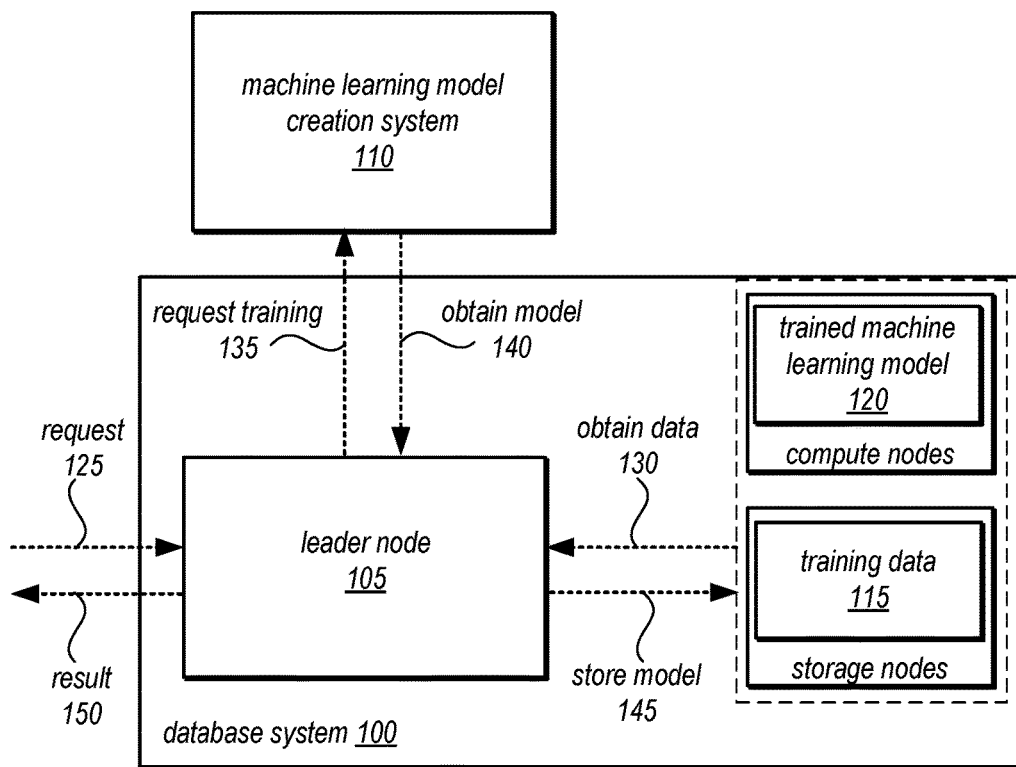
FIG. 1A is a logic diagram showing operations of an example database system related to training of a machine learning model, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to a database system including integrated machine learning capabilities. In some embodiments, the database system may include a plurality of computing resources (e.g., CPUs, GPUs, FPGAs, ASICs, memory, and/or appropriate software) to implement one or more compute nodes and one or more storage nodes. A compute node (including, e.g., one or more various computing components) may broadly refer to a computing resource to perform specifically computation and processing tasks, whereas a storage node (including, e.g., one or more various storage components) may broadly refer to a computing resource to primarily provide storage. In some embodiments, the database system may include one or more query engines, each of which may include a cluster of compute resources (e.g., a cluster compute nodes) selected from the plurality of computing resources to perform data access and analysis. In some embodiments, the database system may receive a request, e.g., from a client through a network interface, to create a machine learning model from training data stored in the database system. In response, the database system may obtain the training data from the database system and invoke a machine learning model creation system to build and train a machine learning model using the training data. In some embodiments, once trained, the database system may obtain the trained model and stored it in the computing resources of the one or more query engine(s). Subsequently, in some embodiments, the database system may move to a testing or deployment phase to use the machine learning model to perform various data analytics.

In some embodiments, the machine learning model creation system may produce an uncompiled version of the machine learning model after training. The uncompiled version of the model may be hardware agnostic which may not require a specific hardware configuration (e.g., a specific type and/or quantity of processor(s) and/or memory) for execution. In addition, in some embodiments, the database system may provide information about the underlining hardware of the computing resources of the query engine(s). In some embodiments, the machine learning model creation system may use the information to compile the uncompiled, hardware agnostic version of the machine learning model to create an executable version of the machine learning model according to the hardware configuration of the computing resources. In this disclosure, for purposes of illustration, it is assumed that the cluster of computing resources of one query engine may have one identical hardware configuration. Therefore, one query engine may correspond to one executable version of the machine learning model. Note that, when the computing resources of one query engine have different hardware configurations, the machine learning model creation system may accordingly create different executable versions of the machine learning model according to the different hardware configurations for the corresponding computing resources, according to some embodiments.

In some embodiments, after training, the database system may receive a request to invoke the machine learning model to generate a prediction or inference from testing data stored in the database system. In some embodiments, the training data and testing data may share some similar or common features, such that the machine learning model trained based on the training data may be used to generate a prediction for the testing data. In some embodiments, the database system may obtain the testing data and apply, at the computing resources of the query engine(s), the executable version(s) of the machine learning model to the testing data to generate the prediction. In some embodiments, the database system may generally use a primary query engine including a cluster of computing resources (e.g., a cluster of compute nodes) to process data access and analytics requests. In some embodiments, the primary query engine may include a workload manager which may evaluate the request to determine whether to perform the request at the primary query engine or assign the request to another computing resource distinct from the primary query engine. In some embodiments, the other computing resource may include a secondary query engine including another cluster of computing resources (e.g., a cluster of compute nodes) of the database system, or a computing resource external to the database system (e.g., the machine learning model creation system). In some embodiments, the assignment may be determined based on various evaluation, e.g., estimated resource requirement for performance of the request invoking the machine learning model at the primary query engine versus capacity of the primary query engine, availability of the primary query engine, capability and/or health status of the other computing resource, predicted execution times of the request at the primary versus the other computing resource, and so on. In some embodiments, when the request is determined to be assigned to a secondary query engine, the database system may select and provision computing resources on-demand to create the secondary query engine, and obtain a corresponding executable version of the machine learning model for the provisioned computing resources of the secondary query engine according to the hardware configuration of the secondary query engine. In some embodiments, the secondary query engine may not necessarily obtain the testing data directly from the database system. Instead, the database system may provide the testing data or a copy of the testing data to a storage system external to the database system, from which the secondary query engine may obtain the testing data to generate the prediction.

In some embodiments, the above-described training and/or testing of the machine learning model may require various preprocessing operations to prepare data (e.g., training data and/or testing data) to make it suitable for use by the machine learning model. For instance, the preprocessing operations may include transforming the data from one format (e.g., a categorical or descriptive format) to another format (e.g., a numerical format), scaling data from one numerical range (e.g., between a minimum and a maximum values) to another numerical range (e.g., between 0 and 1), adding one or more delimiters (e.g., commas) to specify a boundary between the data (e.g., to separate data in different columns of a table), reordering the sequence of data (e.g., moving one column of data in front of or behind another column of data), and/or sampling data to create new data (e.g., creating a new set of data with a smaller size). In some embodiments, the preprocessing operations may be "embedded" as part of the machine learning model creation system—e.g., these preprocessing operations may be performed at the machine learning model creation system.

Alternatively, in some embodiments, the preprocessing logics may be stored in the database system, e.g., at each of the computing resources of the query engine(s). Accordingly, when the query engine(s) accesses the data for training and/or testing of the machine learning model, the query engine(s) may preprocess the "raw" data at the query engine(s) to prepare the data for use by the machine learning model.

In some embodiments, the database system may be a data warehouse service of a provider network. In some embodiments, a provider network may broadly refer to a single-tenant or multi-tenant cloud system—e.g., a private, public, and/or hybrid cloud—accessible by clients through various network connections. A given provider network may include numerous data centers hosting various computing resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the computing resources allocated to a given application may be distributed among several such locations to achieve desired levels of availability, fault-resilience and performance.

FIG. 1A is a logic diagram showing operations of an example database system related to training of a machine learning model, according to some embodiments. As shown in this example, database system 100 may include leader node 105 which may receive request 125 to create a machine learning model from training data 115 stored in database system 100. In some embodiments, database system 100 may receive request 125 through a network interface, e.g., a graphic control console, a command line interface, an application programming interface (API), and the like. In some embodiments, request 125 may be expressed in a query language, e.g., in a SQL statement registered in a PostgreSQL system catalog of database system 100. In some embodiments, responsive to request 125, leader node 105 may obtain training data 115 from database system 100, as indicated by 130. In some embodiments, leader node 105 may send request 135 to invoke machine learning model creation system 110 to build and train the machine learning model, e.g., through an API call. As shown in FIG. 1A, in this example, machine learning model creation system 110 (implemented by computing resources) may reside outside database system 100, according to some embodiments. Alternatively, in some embodiments, machine learning model creation system 110 may be implemented as part of database system 100.

In some embodiments, request 125 may provide specifics regarding the machine learning model, e.g., a type of the model (e.g., supervised, classification, regression, unsupervised, dimensionality reduction, anomaly detection, etc.), a training algorithm (e.g., XGBoost, linear learning, etc.), and so on. Accordingly, machine learning model creation system 110 may build a model according to the given specifics in request 125. Alternatively, in some embodiments, request 125 may not necessarily provide such information, and machine learning model creation system 110 may automatically build a model, e.g., based on training data 115 and/or templates in a model catalog of machine learning model creation system 110.

In some embodiments, training of the machine learning model may require various preprocessing operations to prepare training data 115 to make it suitable for the training of the machine learning model. For instance, it may require to transform at least some of training data 115 from one format to another. For instance, in some embodiments, training data 115 may originally include descriptive data (e.g., a column of data including TRUE, FALSE, etc.). The format transformation may convert the descriptive data to numerical data (e.g., 1, 0, etc.). In some embodiments, training data may include categorical data (e.g., a column of data including Monday, Tuesday, Wednesday, etc.). The format transformation may convert the categorical data to numerical data (e.g., seven columns including 1 and 0 corresponding to the labeled date). In some embodiments, the preprocessing operations may include scaling at least some of training data 115 from one range (e.g., a range between a minimum and a maximum values) to another range (e.g., a normalized range between 0 and 1). In some embodiments, the preprocessing operations may include adding one or more delimiters to specify a boundary between at least some of training data 115. For instance, in some embodiments, machine learning model creation system 110 may require training data 115 to be read as a matrix including columns separated by specific delimiters, such as commas. Therefore, the preprocessing operations may add the commas to training data 115 to specifically separate the data into required columns. In some embodiments, the preprocessing operations may include reordering a sequence for at least some of training data 115. For instance, in some embodiments, machine learning model creation system 100 may require data representing given output of a machine learning model at the first column. Therefore, the preprocessing operations may move those output data to the first column as needed. In some embodiments, the preprocessing operations may include sampling training data 115 to create a new set of data for training of the machine learning model. For instance, in some embodiments, the size of training data 115 may exceed the limit of machine learning model creation system 100. Therefore, the preprocessing operations may sample training data 115 to obtain a new training data set with a smaller size.

In some embodiments, the preprocessing operations may be performed at machine learning model creation system 110 after machine learning model creation system 110 obtains training data 115. Alternatively, in some embodiments, the preprocessing operations may be performed at database system 100, e.g., at a cluster of one or more computing resources selected by database system 100 to implement a query engine to access training data 115 from database system 100 under instructions of leader node 105. Accordingly, the selected computing resources may perform the preprocessing operations to prepare training data 115 and then provide prepared training data 115 to machine learning model creation system 110 for training of the machine learning model. In other words, the preprocessing operations may be external to the machine learning model, and thus may be performed prior to applying the machine learning model to the prepared data. In some embodiments, the preprocessing operations may be specified in request 125. Alternatively, in some embodiments, the preprocessing operations may be identified by database system 100 or machine learning model creation system 110, depending on the location where the preprocessing operations are performed. In some embodiments, in response to receiving request 125, leader node may generate a query plan which may include the preprocessing operations to prepare training data 115. In some embodiments, leader node may further reorder the sequence for one or more operations in the query plan (e.g., to implement a query pushdown) to remove some of training data 115 which may fail to satisfy a requirement for use by the machine learning model, prior to providing the data for training of the machine learning model.

In some embodiments, after training, machine learning model creation system 110 may create an uncompiled version of the machine learning model. In some embodiments, the uncompiled version of the machine learning model may be hardware agnostic which may not require a specific hardware configuration for execution. In some embodiments, database system 100 may include information about the hardware configuration of computing resources of the query engine of database system 100. Accordingly, in some embodiments, machine learning model creation system 110 may use the information to compile the uncompiled, hardware agnostic version of the machine learning model according to the hardware configuration of the computing resources of the query engine to create executable version 120 (including one or more codes, e.g., .exe and/or .dll files, in machine language) of the machine learning model for the query engine. In some embodiments, database system 100 may obtain executable version 120, and optionally also the uncompiled version, of the machine learning model and store them in individual ones of the computing resources of the query engine, as indicated by 140 and 145. Alternatively, in some embodiments, machine learning model creation system 110 may create several executable versions of the machine learning model according to several pre-determined hardware configurations, and database system 100 may select one from the several executable versions according to the hardware configuration of the computing resources of the query engine, and store it at the computing resources. In some embodiments, database system 100 may provide result 150, e.g., to indicate various status regarding the training of the machine learning model. In some embodiments, database system 100 may migrate from one query engine (including one cluster of computing resources) to another query engine (including another cluster of computing resources). For instance, database system 100 may determine that the capacity of an existing query engine not enough to perform requests to database system 100, and therefore upgrade to a new query engine. Accordingly, database system 100 may obtain another executable version of the machine learning model according to the hardware configuration of the upgraded computing resources of the new query engine.

Figure 1B:
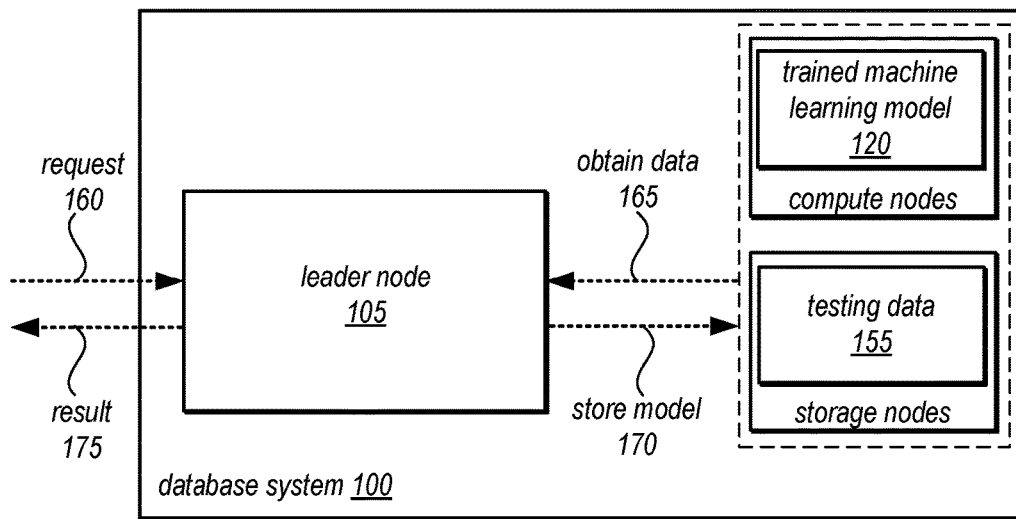
FIG. 1B is a logic diagram showing operations of an example database system related to testing of the machine learning model, according to some embodiments.

FIG. 1B is a logic diagram showing operations of an example database system related to testing of the machine learning model, according to some embodiments. As shown in this example, in some embodiments, after training, database system 100 may receive request 160, at leader node 105, to generate a prediction from testing data 155 stored in database system 100 using the machine learning model. In some embodiments, request 160 may be expressed in a query language, e.g., in a SQL statement registered in the PostgreSQL system catalog of database system 100. In some embodiments, responsive to request 160, leader node 105 may command the computing resources of the query engine to obtain testing data 155 from database system 100 and apply, at the individual ones of the computing resources of the query engine, executed version 120 of the machine learning model to testing data 155 to generate the prediction. In some embodiments, prior to the application of executable version 120 of the machine learning model to testing data 155, the computing resources of the query engine may also perform preprocessing operations (e.g., like those described above for training of the machine learning model) to prepare testing data 155 to make it suitable for use by the machine learning model. In addition, in some embodiments, the computing resources of the query engine may perform various postprocessing operations to produce the final prediction. For instance, the postprocessing operations may correspond to the preprocessing operations to convert the intermediate result back to the original format and/or scale. In some embodiments, database system 100 may provide result 175 to indicate the final prediction for testing data 155 with the machine learning model.

Figure 2:
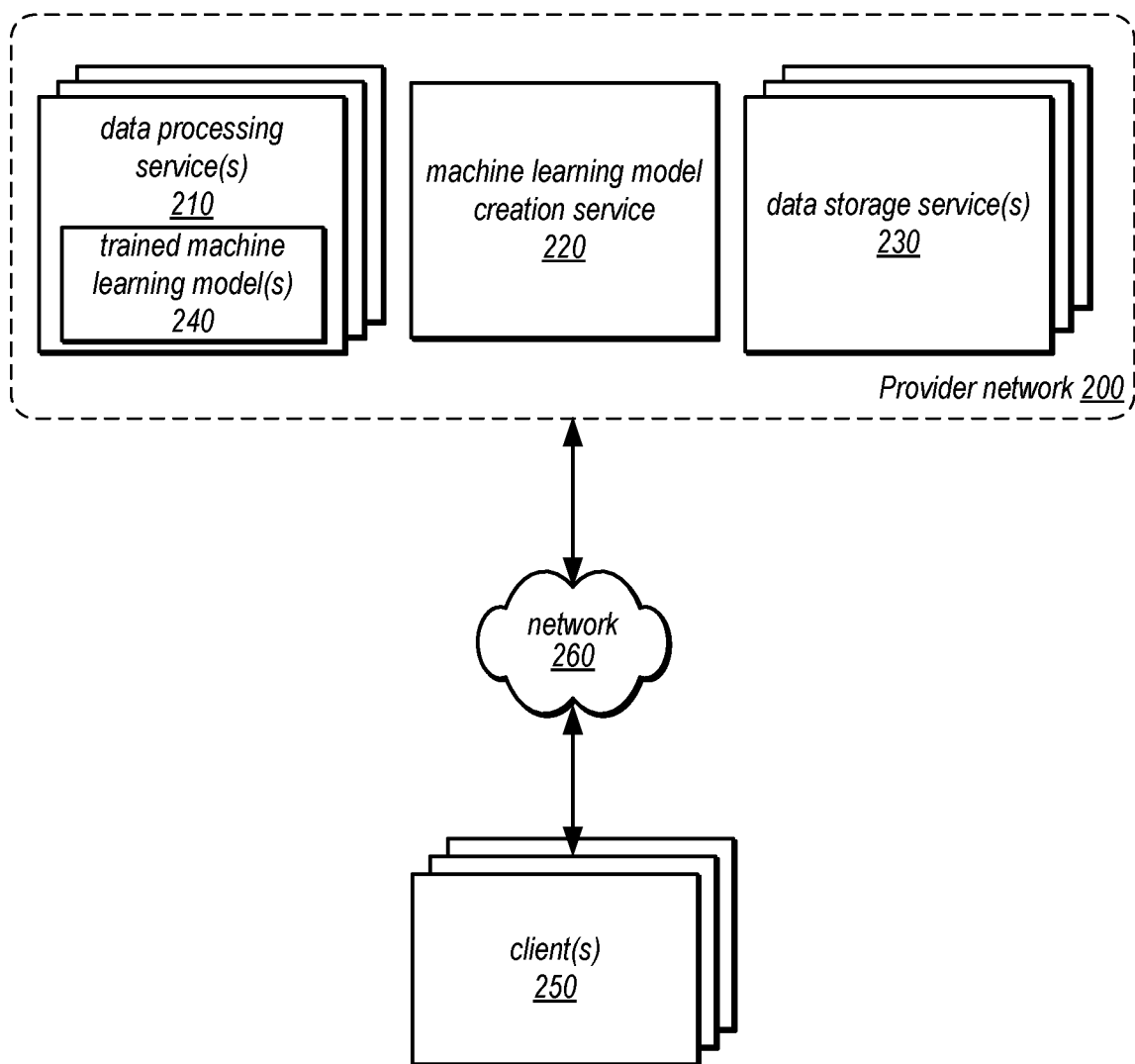
FIG. 2 is a logic diagram showing an example provider network, according to some embodiments.

FIG. 2 is a logic diagram showing an example provider network, according to some embodiments. Provider network 200 may be a private or closed system or may be set up by an entity such as a company or a public sector organization to provide one or more services (such as various types of cloud-based storage) accessible via the Internet and/or other networks 260 to clients 250. Provider network 200 may be implemented in a single or different locations, and may include one or more data centers hosting various resource pools, such as collections of physical and/or virtualized computer servers, storage devices, networking equipment and the like (e.g., computing system 2000 described below with regard to FIG. 16), needed to implement and distribute the infrastructure and storage services offered by the provider network 200. In some embodiments, provider network 200 may implement various computing resources to provide various network-accessible services, e.g., data processing service(s) 210, (e.g., a data warehouse service, a map reduce service, and/or other large scale data processing services or database services), machine learning model creation service 220 (e.g., a model creation and deployment service), and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 16 and described below. In various embodiments, the functionality of a given system or service component (e.g., a component of data processing service 210, machine learning model creation service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., predictive modeling, portfolio analysis, anomaly detection, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible, such as a database supporting Online Analytics Processing (OLAP) features. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3, which may utilize another network-accessible service, such as machine learning model creation service 220, to create machine learning model(s) 240 which may be subsequently used for performance of various data analytics.

Machine learning model creation service 220 may implement various tools (e.g., codes) for building, training and testing (or deploying) machine learning models. In some embodiments, machine learning model creation system 220 may include a model catalog to provide templates for various machine learning models (e.g., supervised, classification, regression, unsupervised, dimensionality reduction, anomaly detection, etc.), training algorithms (e.g., XGBoost, linear learning, etc.), hyperparameter optimization algorithms (e.g., stochastic gradient decent, Adam, RmsProp, etc.), and/or other operations needed for building and training machine learning models. In some embodiments, machine learning model creation service 220 may be accessed by client(s) 250 through network 260, and/or by another service of provider network 200 such as data processing service(s) 210 (e.g., through an API). For instance, data processing service(s) 210 may invoke machine learning model creation service 220 to create machine learning model(s) 240 from training data stored in data processing service(s) 210. Data processing service(s) 210 may provide the training data or a copy of the training data to data storage service(s) 230. Machine learning model creation service 220 may obtain the training data from data storage service(s) 230 and perform the training to create an uncompiled, hardware agnostic version of the machine learning model. Machine learning model creation service 220 may further create executable version(s) 240 of the trained machine learning model according to hardware configuration(s) of one or more computing resources selected by data processing service(s) 210 to implement query engine(s). Machine learning model creation service 220 may provide executable version(s) 240, and optionally also the uncompiled version, of the machine learning model to data storage service(s) 230. Data processing service(s) 210 may obtain executable version(s) 240, and optionally the uncompiled version, of the machine learning model from data storage service(s) 230 and store them in the selected computing resources of data processing service(s) 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphic control console. For example, machine learning model creation service 220 may access data objects stored in data storage service(s) 230 through an API.

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, machine learning model creation service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various requests for data already ingested or stored in the data processing service or data stored in a data lake hosted in data storage service(s) 230.

Clients 250 may convey network-based services requests (e.g., access requests to read or write data may be directed to data in data storage service(s) 230, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, machine learning model creation service 220, and/or data storage service(s) 230 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
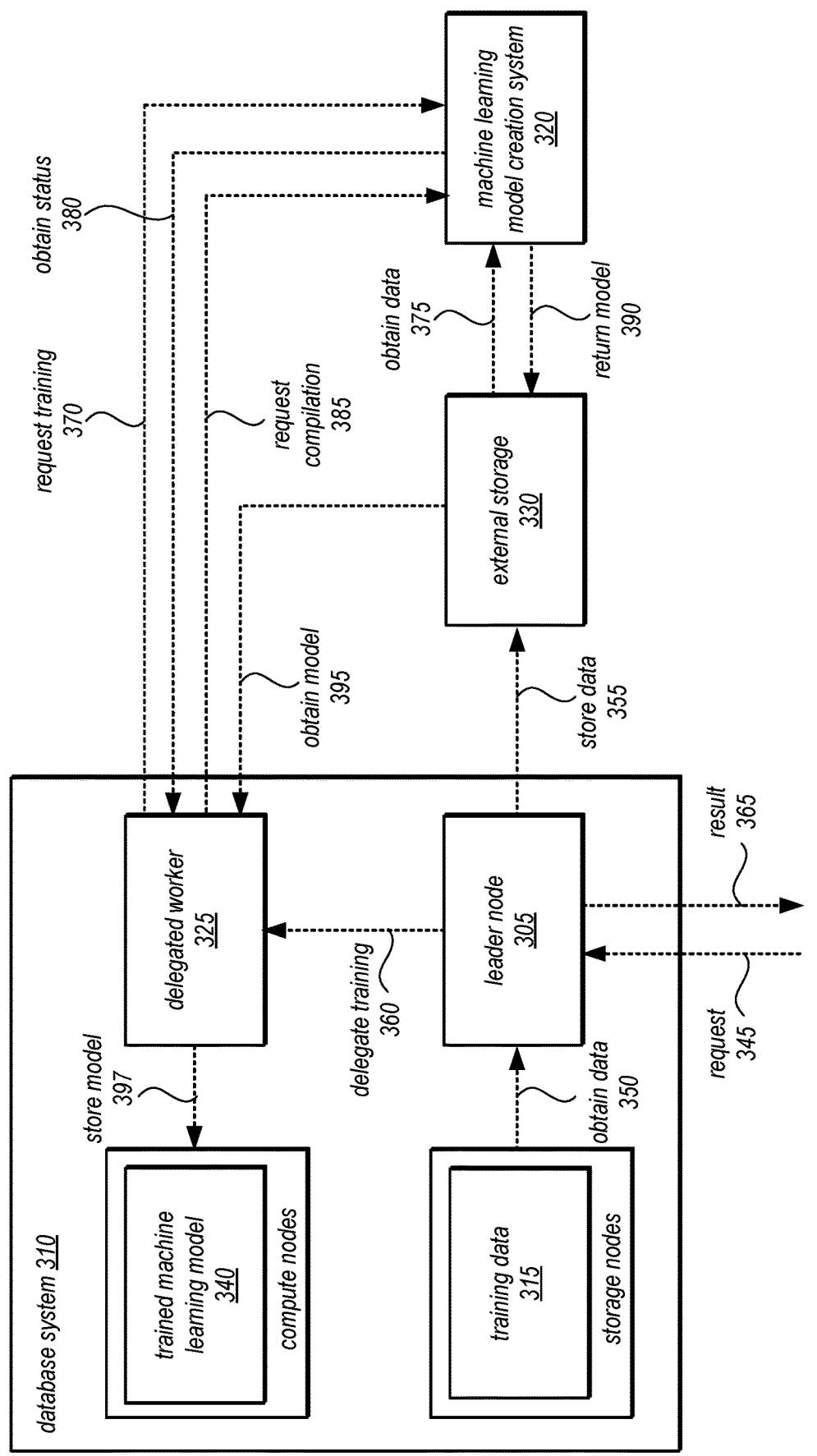
FIG. 3 is a logic diagram showing training of an example machine learning model, according to some embodiments.

FIG. 3 is a logic diagram showing training of an example machine learning model, according to some embodiments. A shown in this example, in some embodiments, database system 310 (e.g., like database system 100 and data processing service(s) 210 in FIGS. 1-2) may receive, at leader node 305, request 345 to generate a machine learning model from training data 315 stored in database system 310. In embodiments, responsive to request 345, leader node 305 may provide training data 315 or a copy of training data 315 from database system 310 to storage system 330 (e.g., like data storage service(s) 230 in FIG. 2) which may be external to database system 310, as indicated by 350 and 355. In some embodiments, leader node 305 may assign delegated worker 325, as indicated by 360, to coordinate with machine learning model creation system 320 (e.g., like machine learning model creation system 110 and machine learning model creation service 220 in FIGS. 1-2) to perform training of the machine learning model. The use of delegated worker 325 may free leader node 305 from operations related to training of the machine learning model, such that leader node 305 may focus on processing requests to database system 310. In some embodiments, leader node 305 may provide result 365 indicating receipt of request 345 and start of training of the machine learning model.

In some embodiments, delegated worker 325 may invoke machine learning model creation system 320 to build and train the machine learning model, as indicated by 370. In some embodiments, in response, machine learning model creation system 320 may obtain training data 315 from external storage 330, as indicated by 375, and train the machine learning model with the training data. In some embodiments, delegated worker 325 may obtain various status of the training from machine learning model creation system 320, as indicated by 380, and provide the status (e.g., displaying the status through a graphic interface) to a client.

In some embodiments, after training, machine learning model creation system 320 may create an uncompiled, hardware agnostic version of the machine learning model. In some embodiments, delegated worker 325 may request machine learning model creation system 320 to further compile the uncompiled version to create an executable version 340 of the machine learning model according to a hardware configuration of one or more computing resources of a query engine of database system 310, as indicated by 385. In some embodiments, to dynamically compiling the uncompiled version of the machine learning model, machine learning model creation system 320 may use another machine learning model (e.g., Apache TVM) to analyze the hardware configuration of the given computing resources to identify appropriate compiler and/or kernel libraries to implement code optimizations (e.g., auto differentiation and/or dynamic memory management). In some embodiments, machine learning model creation system 320 may send executable version 340, and optionally also the uncompiled version, of the machine learning model to external storage 330, as indicated by 390. In some embodiments, delegated worker 325 may obtain executable version 340, and optionally the uncompiled version, of the machine learning model from external storage 330, as indicated by 395, and store them to the computing resources of the query engine of database system 310, as indicated by 397.

Figure 4:
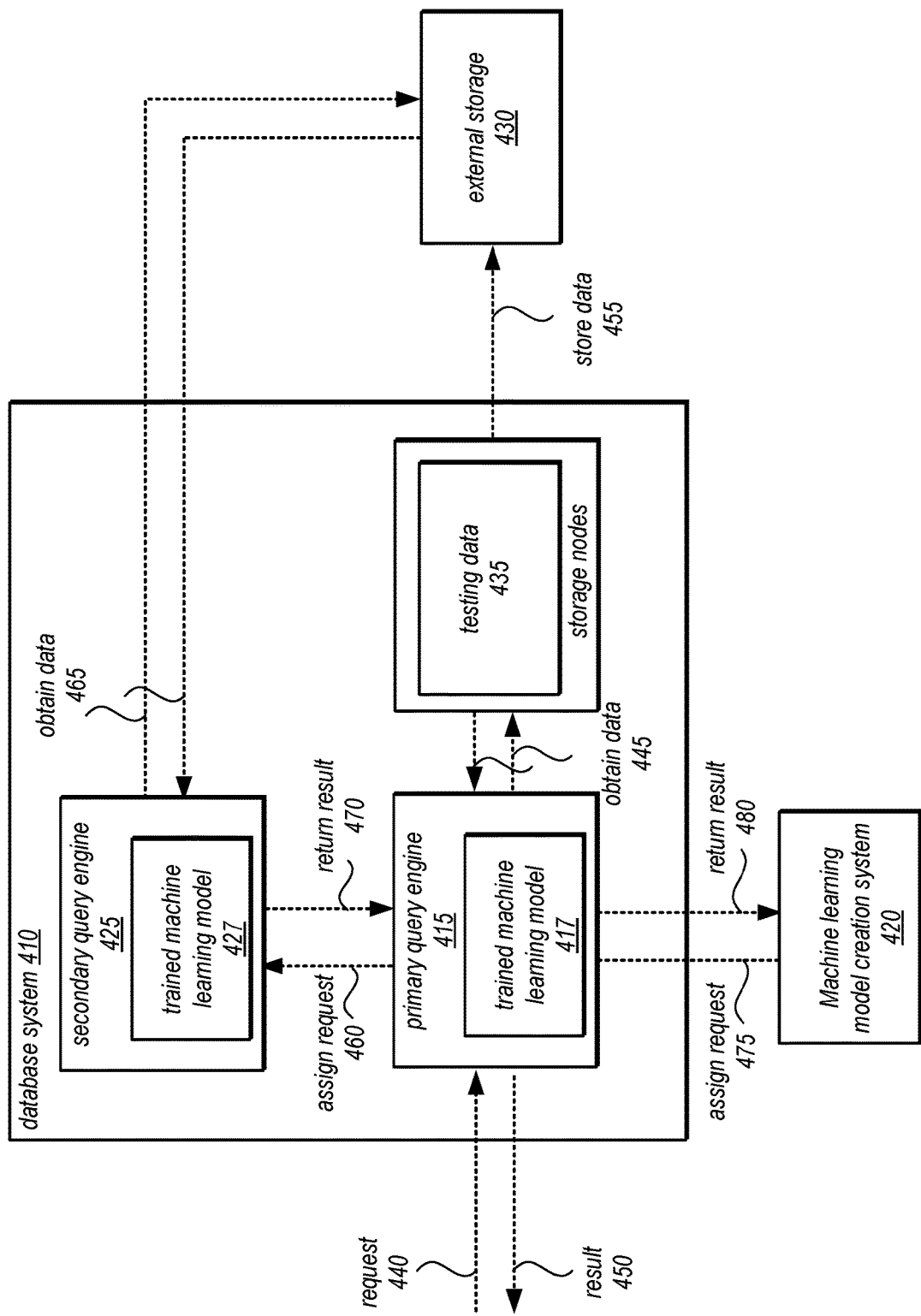
FIG. 4 is a logic diagram showing testing of an example machine learning model, according to some embodiments.

FIG. 4 is a logic diagram showing testing of an example machine learning model, according to some embodiments. As shown in this example, in some embodiments, database system 410 (e.g., as described in FIGS. 1-3) may have primary query engine 415 which may include a cluster of computing resources (e.g., compute nodes) selected from a plurality of computing resources of database system 410 to process requests to database system 410. In addition, the computing resources of primary query engine 415 may individually include executable version 417 of a machined learning model. In some embodiments, database system 410 may receive, at primary query engine 415, request 440 to generate a prediction from testing data 435 stored in database system 410 using the machine learning model. Unlike a transactional query to a typical database for relatively simple data access (e.g., retrieve, add, delete, and/or modify), an analytic query like request 440 may involve complex and resource-intensive data processing (e.g., predictive analytics, portfolio analysis, etc.) for vast amounts of data. Therefore, in some embodiments, primary query engine 415 may include a workload manager, which may perform concurrency scaling for workload balance. The concurrency scaling may add computing resources to process requests to database system 410 on an on-demand basis. For instance, in some embodiments, the workload manager may evaluate request 440 to determine whether to perform request 440 at primary query engine 415 or assign request 440 to another computing resource distinct from primary query engine. In some embodiments, the other computing resource may include secondary query engine 425 provisioned on-demand by database system 410 or a computing resource external to database system 410, e.g., machine learning model creation system 420.

In some embodiments, responsive to determining to perform request 440 at primary query engine 415, request 440 may be performed like described in FIG. 1B. For instance, primary query engine 415 may obtain testing data 435 from database system 410, as indicated by 445, and apply executable version 417 of the machine learning model to testing data 435 at the computing resources of primary query 415 to produce the prediction. Alternatively, in some embodiments, when request 440 is determined to be assigned to secondary query engine 425, as indicated by 460, database system 410 may select appropriate computing resources and provision the computing resources on-demand to create secondary query engine 425. In addition, in some embodiments, the provision of secondary query engine 425 may include obtaining executable version 427 of the machine learning model according to the hardware configuration of the computing resources of secondary query engine 425. In some embodiments, secondary query engine 425 may not necessarily access testing data 435 directly from database system 410. Instead, primary query engine 415 may send testing data 435 or a copy of testing data 435 to external storage system 430 (e.g., like in FIGS. 1-3), as indicated by 455. In some embodiments, secondary query engine 425 may obtain testing data 435 from external storage system 430, as indicated by 465, and apply executable version 427 of the machine learning model to testing data 435 to generate the prediction. Secondary query engine 425 may then provide the prediction to primary query engine 415, as indicated by 470. In some embodiments, request 440 may be assigned to a computing resource outside database system 410, e.g., machine learning model creation system 420, as indicated by 475. In some embodiments, primary query engine 415 may send testing data 435 or a copy of testing data 435 to machine learning model creation system 420, as indicated by 475. In response, machine learning model creation system 420 may generate and return the prediction, as indicated by 480. In some embodiments, after obtaining the prediction, primary query engine 415 may provide result 480 to a client.

Figure 5:
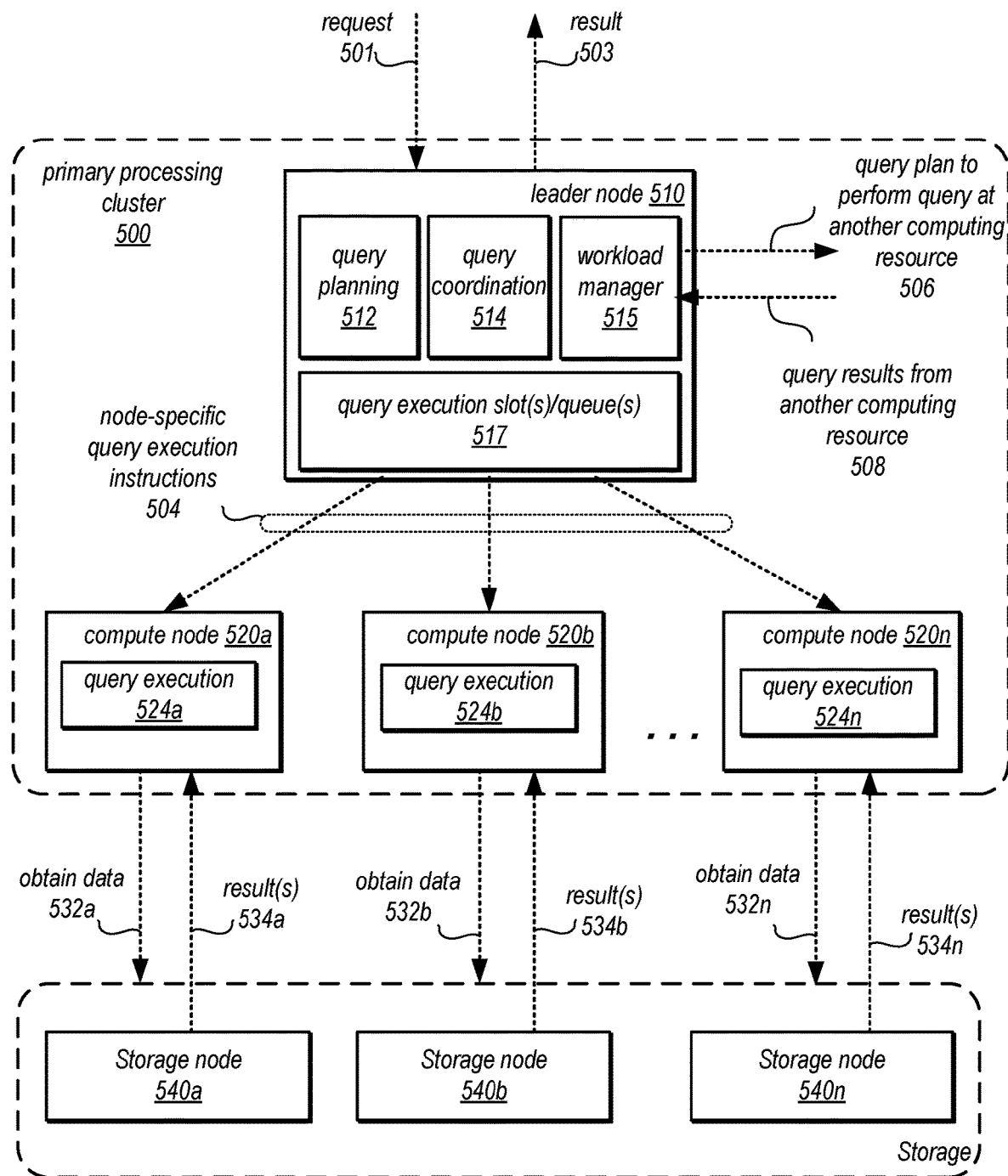
FIG. 5 is a logical diagram showing an example primary processing cluster of a database system, according to some embodiments.

FIG. 5 is a logical diagram showing an example primary processing cluster of a database system, according to some embodiments. Primary query engine 500 (e.g., like the query engine or primary query engine described in FIGS. 1-4) may be a cluster of one or more computing resources of a data warehouse service. As illustrated in this example, primary processing cluster 500 may include a leader node 510 and compute nodes 520a, 520b, and 520n, which may communicate with each other over an interconnect (not illustrated). Leader node 510 (e.g., like leader node 105 and 305 in FIGS. 1 and 3) may implement query planning 512 to generate query plan(s), query coordination 514 for coordinating queries execution on primary processing cluster 500 (e.g., by utilizing one or more query execution slot(s)/queue(s) 517), and workload manager 515 (e.g., as described in FIG. 4) for selecting, routing, directing, or otherwise causing a received query to be performed using another computing resource (e.g., secondary processing cluster 600 in FIG. 6 discussed below or a machine learning model creation system discussed above in FIGS. 1-4).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In some embodiments, primary processing cluster 500 may be implemented as part of a data warehouse service or another one of data processing service(s) 210, as discussed above with regard to FIG. 2. Leader node 510 may manage communications with clients, such as clients 250 discussed above with regard to FIG. 2. For example, leader node 510 may be a server that receives a request 501 from various client programs (e.g., applications) and/or subscribers (users), then parses them and develops an execution plan (e.g., query plan(s)) to carry out the associated database operation(s)). More specifically, leader node 510 may develop the series of steps (e.g., a query plan) necessary to obtain results for request 501. Request 501 may be directed to data that is stored at storage nodes 540a, 540b, and 540n. For example, node-specific query instructions 504 may be generated or compiled code by query execution 514 that is distributed by leader node 510 to various ones of the compute nodes 520 to carry out the steps needed to perform request 501, including executing the code to generate intermediate results of request 501 at individual compute nodes may be sent back to the leader node 510. Leader node 510 may receive data and results from compute nodes 520 in order to determine a final result 503 for request 501. A database schema, data format and/or other metadata information for the data stored among storage nodes 540. As discussed in more detail below with regard to FIG. 8, a leader node may implement workload manager 515 to send 506 a query plan generated by query planning 512 to be performed at a secondary processing cluster and return result 508 received from the secondary processing cluster to a client as part of results 503. In this way, secondary query processing may occur without client application changes to establish a separate connection or communication scheme with secondary processing resources, allowing for seamless scaling between primary and secondary processing capacity.

Processing cluster 500 may include compute nodes, such as compute nodes 520a, 520b, and 520n. Compute nodes 520, may for example, be implemented on servers or other computing devices, such as those described below with regard to a computer system in FIG. 16, and each may include individual query processing "slices" defined, for example, for each core of a server's multi-core processor, one or more query processing engines, such as query execution 524a, 524b, and 524n, to execute the instructions 504 or otherwise perform the portions or sub-queries of the query plan assigned to the compute node. Query execution 524 may access a certain memory and disk space in order to process a portion of the workload for a query (or other database operation) that is sent to one or more of the compute nodes 520. Query execution 524 may individually include an executable version of a machine learning model. Query execution 524 may access storage nodes, such as 540, 540b, and 540n, to perform data access and/or analytics operation(s), as indicated by 532 and 534. For example, query execution 524 may scan data in storage nodes 540, access indexes, perform joins, semi joins, aggregations, generate predictions with the machine learning model (as described above in FIGS. 1-4), or any other processing operation assigned to compute nodes 520. Compute nodes 520 may send intermediate, sub-query results from sub-queries back to leader node 510 for final result generation (e.g., the final prediction by combining, aggregating, modifying, joining, etc.).

Storage nodes 540 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6:
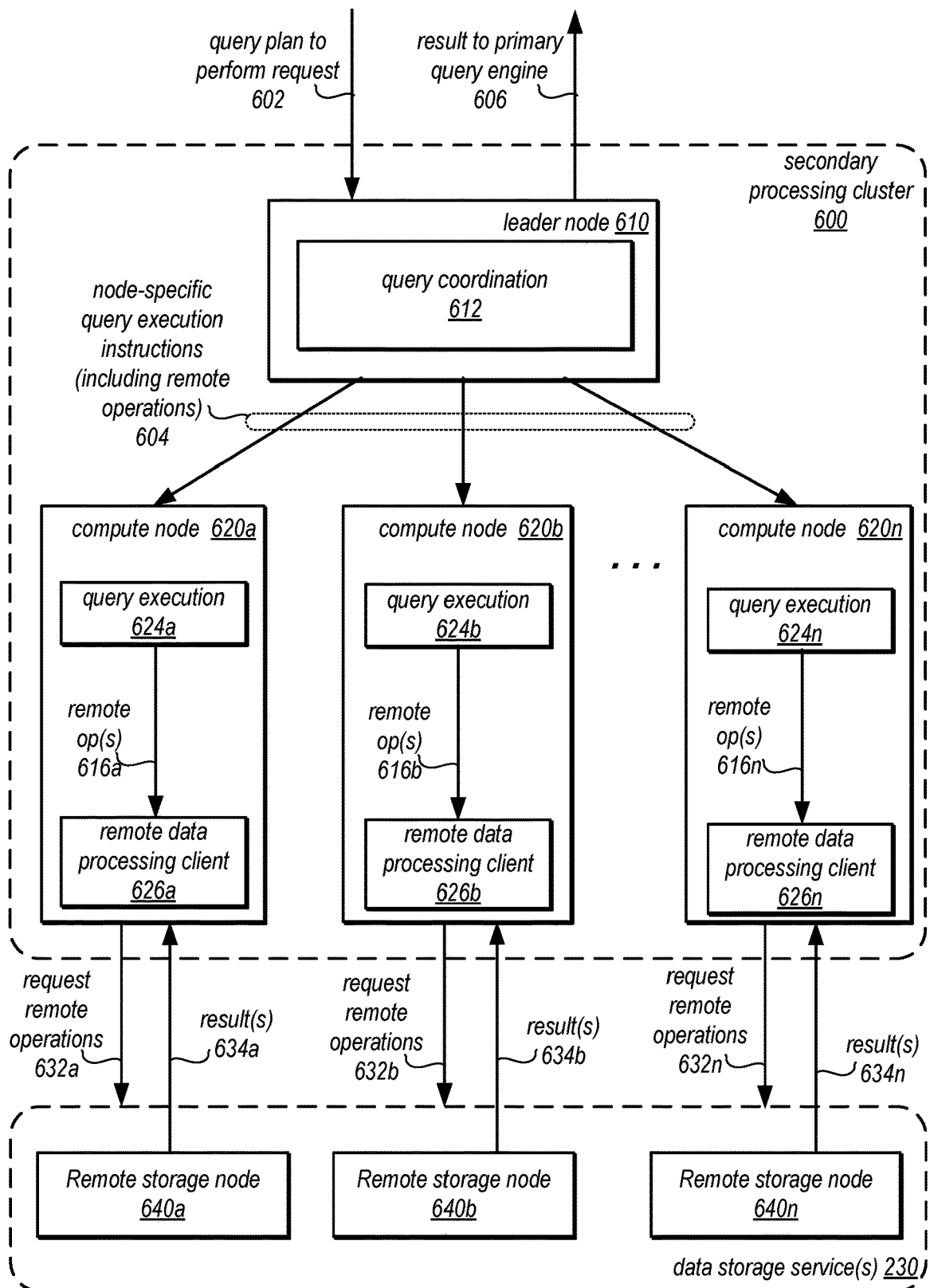
FIG. 6 is a logical diagram showing an example secondary processing cluster of a database system, according to some embodiments.

FIG. 6 is a logical diagram showing an example secondary processing cluster of a database system, according to some embodiments. Similar to primary processing cluster 500 in FIG. 5, secondary processing cluster 600 may include a leader node 610 and compute nodes 620a, 620b, and 620n, which may communicate with each other over an interconnect (not illustrated). Leader node 610 may implement query execution 612 for executing queries on secondary processing cluster 600. For example, leader node 610 may receive a query plan 602 to perform a request from a primary processing cluster. Query execution 612 may generate the instructions or compile code to perform the query according to the query plan. Leader node 610 may also manage the communications among compute nodes 620 instructed to carry out database operations for data stored in the secondary processing cluster 600. For example, node-specific query instructions 604 may be generated or compiled code by query execution 612 that is distributed by leader node 610 to various ones of the compute nodes 620 to carry out the steps needed to perform query plan 602, including executing the code to generate intermediate results of the query at individual compute nodes may be sent back to the leader node 610. Leader node 610 may receive data and query responses or results from compute nodes 620 in order to determine a final result 606 for the query to be sent back to the primary processing cluster.

In some embodiments, secondary processing cluster 600 may not access a "local" copy of the database, but instead a backup external to the database. For example, query execution 624a may direct the execution of remote data processing operations, by providing remote operation(s), such as remote operations 616a, 616b, and 616n, to remote data processing clients, such as remote data processing client 626a, 626b, and 626n, in order to access data from storage nodes 640a, 640b, and 640n of data storage service(s) 230 (external to the database system of secondary processing cluster 600) to perform a request. In some embodiments, remote data processing clients 626 may be implemented by a client library, plugin, driver or other component that sends request sub-queries, such as sub-quer(ies) 632a, 632b, and 632n to storage nodes 640 of data storage service(s) 230. Remote data processing clients 626 may read, process, or otherwise obtain results from processing nodes, including partial results of different operations (e.g., aggregation operations) and may provide sub-query result(s), including result(s) 634a, 634b, and 634c, back to query execution 624, which may further process, e.g., generating an intermediate, sub-prediction using a machine learning model. In at least some embodiments, processing nodes 640 may filter, aggregate, or otherwise reduce or modify data from the database backups used to perform the query in order to lessen the data transferred and handled by secondary processing cluster 600, increasing the performance of the query at secondary processing cluster 600.

Although not illustrated in FIGS. 5 and 6, further communications between a primary processing cluster and secondary processing cluster may be implemented. For example, database metadata may be obtained at secondary processing cluster 600 from a database backup and then updated as updates are made at the primary processing cluster, in some embodiments, as discussed below with regard to FIG. 7. In some embodiments, compute nodes 620 (or leader node 610) may request data directly from compute nodes 520 in primary processing cluster 500), such as updated data blocks in a table of a database. In at least one embodiment, all of the data used to perform a request may be obtained by compute nodes 620 from compute nodes 520 without using data storage service(s) 230.

Figure 7:
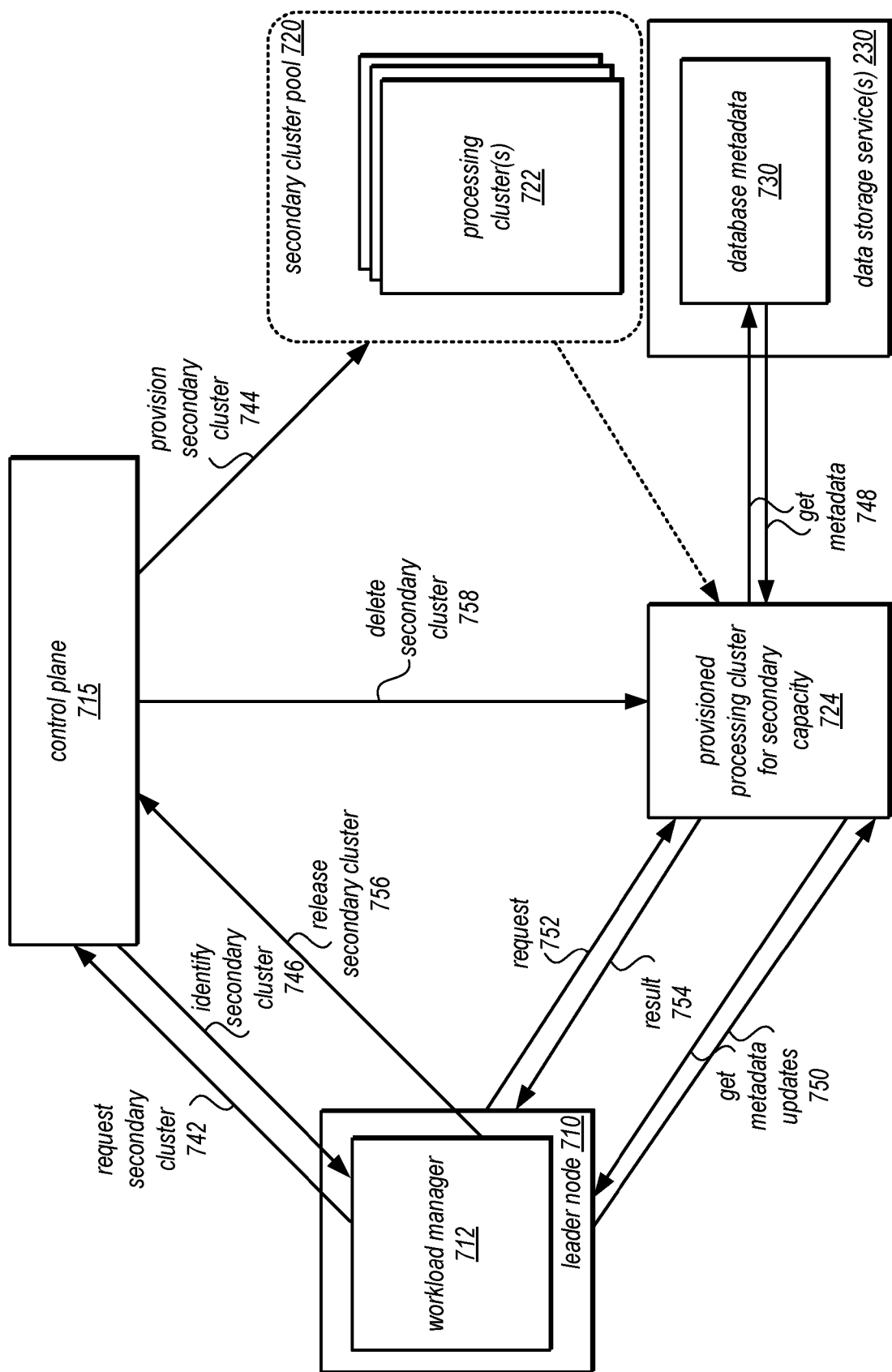
FIG. 7 is a logical block diagram showing example interactions to obtain and release a secondary processing cluster from a pool of secondary processing clusters, according to some embodiments.

FIG. 7 is a logical block diagram showing example interactions to obtain and release a secondary processing cluster from a pool of secondary processing clusters, according to some embodiments. Workload manager 712 at leader node 710 of a database system (e.g., like the workload manager described in FIGS. 4-5) may detect or determine when to obtain a secondary cluster for performing queries in various scenarios, as described above in FIG. 4. Workload manager 712 may then request a secondary cluster 742 from the database system, e.g., through control plane 715 of the database system. The request may, in some embodiments, specify a type of secondary cluster. In some embodiments, control plane 715 may evaluate a manifest, index, or other data that describes available processing cluster(s) 722 in secondary cluster pool 720 in order to satisfy the request. For example, control plane 715 may identify a processing cluster that matches (or best matches) the specified configuration of the secondary cluster request, in some embodiments. In some embodiments, control plane 715 may identify a secondary cluster that was previously used for performing queries to the database hosted by the cluster of leader node 710.

Control plane 715 may provision 744 the secondary cluster, in some embodiments, from secondary cluster pool, such as provisioned secondary cluster 724. Provisioning a secondary cluster may include various operations to configure network connections between provisioned processing cluster for secondary capacity 724 and leader node 710 and other services (e.g., data storage service(s) 230). In some embodiments, access credentials, security tokens, and/or encryption keys may be provided so that provisioned processing cluster for secondary capacity 724 can access and database data to perform queries for the database. In some embodiments, initialization procedures, workflows or other operations may be started by control plane 715 at provisioned processing cluster for secondary capacity 724. For example, provisioned processing cluster for secondary capacity 724 may get metadata 748 from data storage service(s) 230 that is stored as part of database metadata 730 in a database backup in order to perform queries to the database. In some embodiments, provisioned processing cluster for secondary capacity 724 may get metadata updates 750 directly from leader node 710 (or other nodes in a primary processing cluster) in order to catch up the metadata to account for changes that occurred after the backup was stored.

Once provisioning is complete, provisioned processing cluster for secondary capacity 724 may be made available for performing requests. Control plane 715 may identify the secondary cluster 746 to leader node 710 (e.g., by providing a network endpoint for provisioned cluster 724), in some embodiments. Leader node 710 may then begin directing assigned request 752 to provisioned cluster 724, which may perform the request and send back result 754 to leader node 710, which may provide the result to a client in turn. In this way, a client application does not have to learn of and receive requests from a second location, provisioned cluster 724 when secondary performance is used, in some embodiments. Workload manager 712 may request different types, sizes, or other configurations of secondary clusters to, for instance, compare performance of queries.

When an event that triggering release of the secondary cluster occurs, workload manager 712 may send a request to control plane 715 to release the secondary cluster 756 (e.g., by including the identifier of the provisioned cluster 724).

Control plane 715 may then delete the secondary cluster 758 (e.g., by removing/deleting data and/or decommissioning/shutting down the host resources for the provisioned cluster 724).

Figure 8:
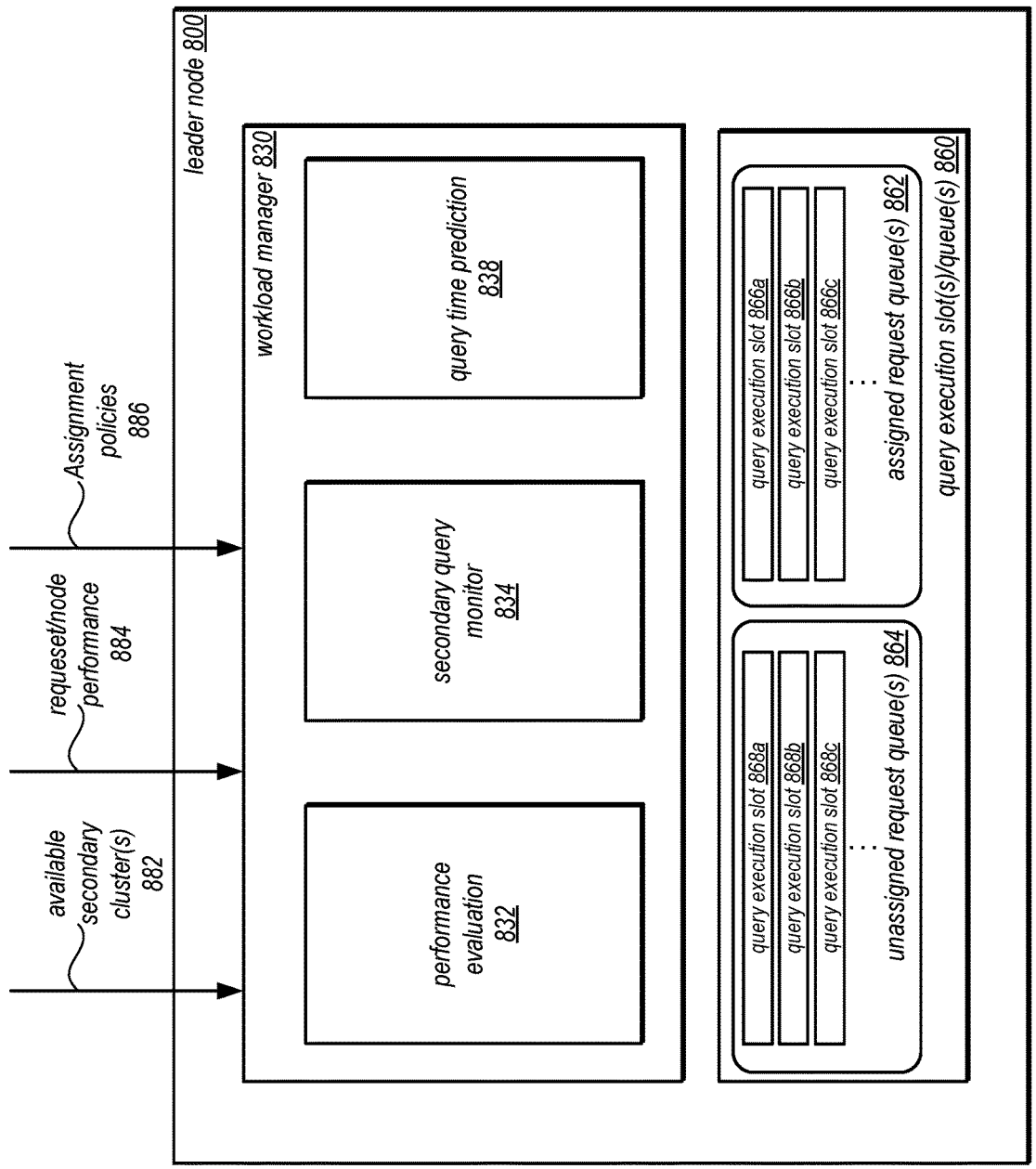
FIG. 8 is a logical block diagram illustrating an example of workload manager that implements dynamically assigning queries to secondary processing resources, according to some embodiments.

FIG. 8 is a logical block diagram illustrating an example of workload manager that implements dynamically assigning queries to secondary processing resources, according to some embodiments. Leader node 800 (like one described above in FIGS. 1-7) may implement workload manager 830 (like one described above in FIGS. 4-7) to perform dynamic assignments of requests, in some embodiments. As illustrated in FIG. 8, workload manager 830 may be implemented by leader node to assign the cluster to perform database requests, in some embodiments. For example, workload manager 830 may implement performance evaluation 832, which may evaluate resource requirement for performance of a request at the primary processing cluster versus capacity of the primary processing cluster. In some embodiments, the resource requirement for performance of the request may be estimated based on, e.g., performance of a prior request with a machine learning mode or another (e.g., similar) machine learning model, and/or resource requirements during training of the machine learning model, etc. In some embodiments, the capacity of the primary processing cluster may be determined according to a historical workload of the primary query engine, e.g., historical and/or current occupancy and available capacity of processor(s), memory, I/O bandwidth, and/or network bandwidth of the primary processing cluster. The workload, resource allocation, or otherwise state of the primary processing cluster may be indicated by queue/slot state which may be provided and used to make cluster selections. For example, query execution slot(s)/queue(s) 860 may be maintained as part of leader node 800, in some embodiments. Query execution slot(s)/queue(s) 860 may, in some embodiments, be implemented as part of a queue (not illustrated). A query execution slot, such as query execution slots 866*a*, 866*b*, 866*c*, 868*a*, 868*b*, and 868*c*, may identify a process that is allocated for a certain portion of computing resources at a processing cluster (e.g., processor, memory, I/O bandwidth, network bandwidth, etc.) to perform a query assigned to that slot. When the estimated resource requirement for performing the request is less than the available capacity, the request may be assigned to the primary processing cluster. Otherwise, the request may be assigned to another computing resource, e.g., a provisioned secondary processing cluster of the database system or a computing resource external to the database system (e.g., a machine learning model creation system) as described above.

In some embodiments, performance evaluation 832 may also compare the costs for performing the request using computing resources of the database system (e.g., a primary or secondary query engine) versus computing resources outside the database system (e.g., a machine learning model creation system), and assign the request to the computing resources with the less cost. For instance, the machine learning model creation system may implement specific computing resources which perform predictions using a machine learning model more cost efficiently, and therefore performance evaluation 832 may assign the request to the machine learning model creation system.

In some embodiments, workload manager 803 may implement query time prediction 838, which may apply one or more size classifiers to the query plan in order to classify a size that indicates an expected/predicted execution time of the query, (e.g., "small/short," "medium," or "large/long" queries). For instance, a rules-based decision engines for classifying the size of a query may be applied (e.g., which may apply different rules to features of the query, such as the size of the table being queried, the type of operations (e.g., joins and/or scans), the source of the query (e.g., which client application or user account, by checking to see if the query has been performed before and how long it performed, number of storage locations accessed, types of queries that cannot by definition be "small" or "medium", etc.). In some embodiments, query size classifier(s) may be trained using machine learning techniques so that when a size classifier 840 is applied to features of the plan, a probability indicative of a size of the database query may be generated, in some embodiments. For example, a linear classifier may be applied to score the features of the query plan according to a weighted sum of the features (e.g., by applying coefficients to the features determined from training the classifier according to logistic regression). In some embodiments, other features in addition to the query plan may be considered, such as the source of the query (e.g., what user submitted the query), time of day, what table(s) are identified in the query, among others. The size classifiers may be trained to specific query engines, in some embodiments. In this way, the varying configurations of secondary query processing clusters, for instance, may be considered which may alter query performance when classifying a query's size.

The output of the classifiers may be a probability value, in various embodiments. The probability value may be compared to a classification threshold, in some embodiments. For example, if the greater the probability value indicates the longer a query is likely to run and thus a greater size, then ranges of probabilities may correspond to different sizes at different clusters (e.g., "small-secondary," "small-primary," "medium-secondary," "medium-primary," "large-secondary," or "large-primary" queries), in some embodiments. In some embodiments, separate size classifiers, such as a classifier for small queries, a classifier for medium queries, and a classifier for large queries may be applied to select as the size the classification with the highest confidence score.

Workload manager 830 may implement secondary query monitor 834, which may perform various techniques to manage or observe status and request performance at secondary processing clusters. Query node performance 884 may be received to determine whether a request exceeds the capacity of the secondary processing cluster or detect whether there is a failure at the secondary processing cluster. If yes, secondary query monitory 834 may send the request back to the primary processing cluster.

In some embodiments, workload manager 830 may be configured via user and/or control plane requests. For example, assignment policies 886 may be received, created, deleted, or modified, in some embodiments. In some embodiments, assignment policies 886 may allow users (or the control) to specify via an interface when secondary performance of queries may be enabled or disabled for a primary processing cluster. For example, secondary can be enabled/disabled automatically in order to optimize for cost or performance, in some embodiments. A maximum queue time or other performance criteria for the primary processing cluster could be specified as part of assignment policies 880 for queries, for instance, may determine when secondary processing should occur (e.g., if queries would exceed the queue time then begin using bust capacity). In some embodiments, a secondary budget (e.g., a cost limitation for using secondary processing clusters) or other limitation may be specified as part of assignment policies 880 in order to allow a user/client application to indicate when secondary should stop so that the budget or other limitation is not exceeded (e.g., for a given time period, such as a day, week, month, etc.).

Figure 9:
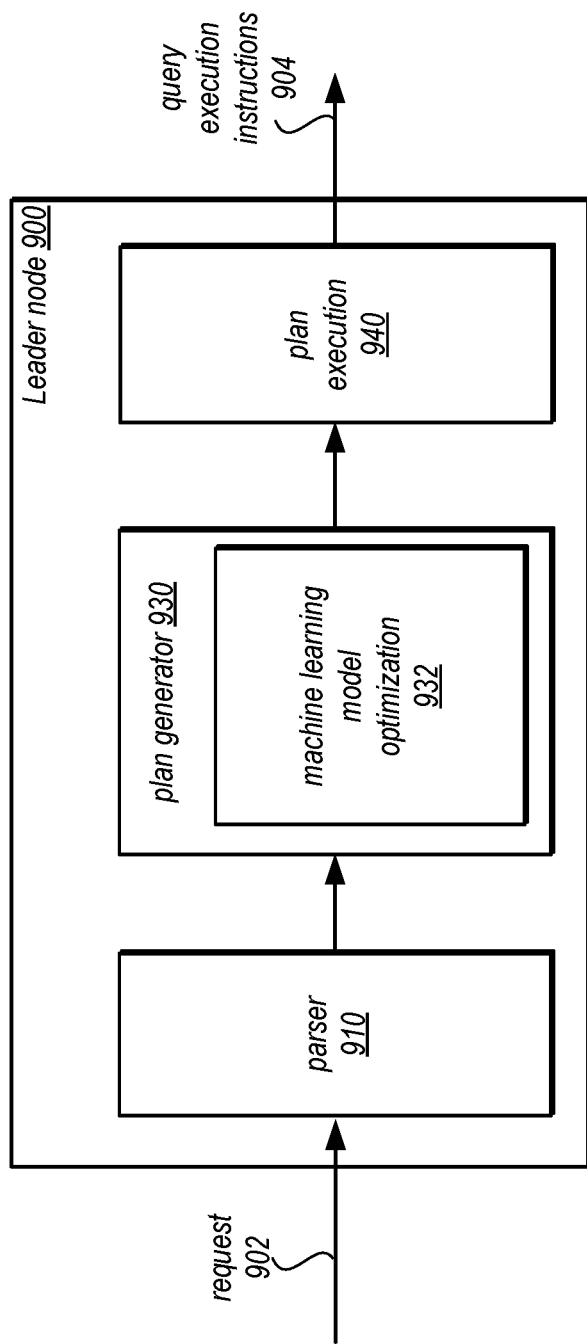
FIG. 9 is a logical block diagram showing query planning for a query engine implemented by a processing cluster, according to some embodiments.

FIG. 9 is a logical block diagram showing query planning for a query engine implemented by a processing cluster, according to some embodiments. Leader node 900 may implement parser 910 to receive a request 902, such as one expressed in a query language (like a SQL statement), and determine the various requested operations to perform as a result of request 902. For example, parser 910 may generate a query plan for a given request input string to separate out the various request clauses, fields, predicates, conditions, commands, or other request information for planning and optimization. Leader node 900 may also implement plan generator 930. Plan generator 930 may perform various operations to generate a query execution plan (e.g., a tree of plan operation nodes, which may be later used to generate query execution code). For example, plan generator 930 may perform a cost-based optimization to select one of various combinations or orderings of plan operator nodes in a tree produces a least costly plan to execute. For example, as discussed above with regard to FIGS. 1 and 4, plan generator 930 may include machine learning model optimization 932. In some embodiments, machine learning model optimization 932 may implement a query pushdown to reorder one or more operations in a query plan to remove some data which may fail to satisfy a requirement for use by a machine learning model. The query pushdown may be implemented by changing the location or ordering of predicates, join operations, or other portions or operations in the query plan. The pushdown is an optimization to improve the performance of a request according to the query plan by moving performance of the pushed-down operations as close to the data as possible. In some embodiments, the pushed-down operations may filter data obtained from a database system according to one or more criteria (e.g., the requirement of a machine learning model), such that the data that fails to satisfy the requirement may be removed as early as possible and less data may be returned for further scanning/final retrieval. As a result, the machine learning model may only need to be applied to a smaller-size, finally retrieved data, e.g., to generate a prediction and/or perform a training. Leader node 900 may implement plan execution 940. Plan execution 940 may receive the selected query plan, generate instructions to perform the query plan, and send the query execution instructions (e.g., to query execution nodes 520). For example, the instructions may be generated and sent as code (or executables).

Figure 10:
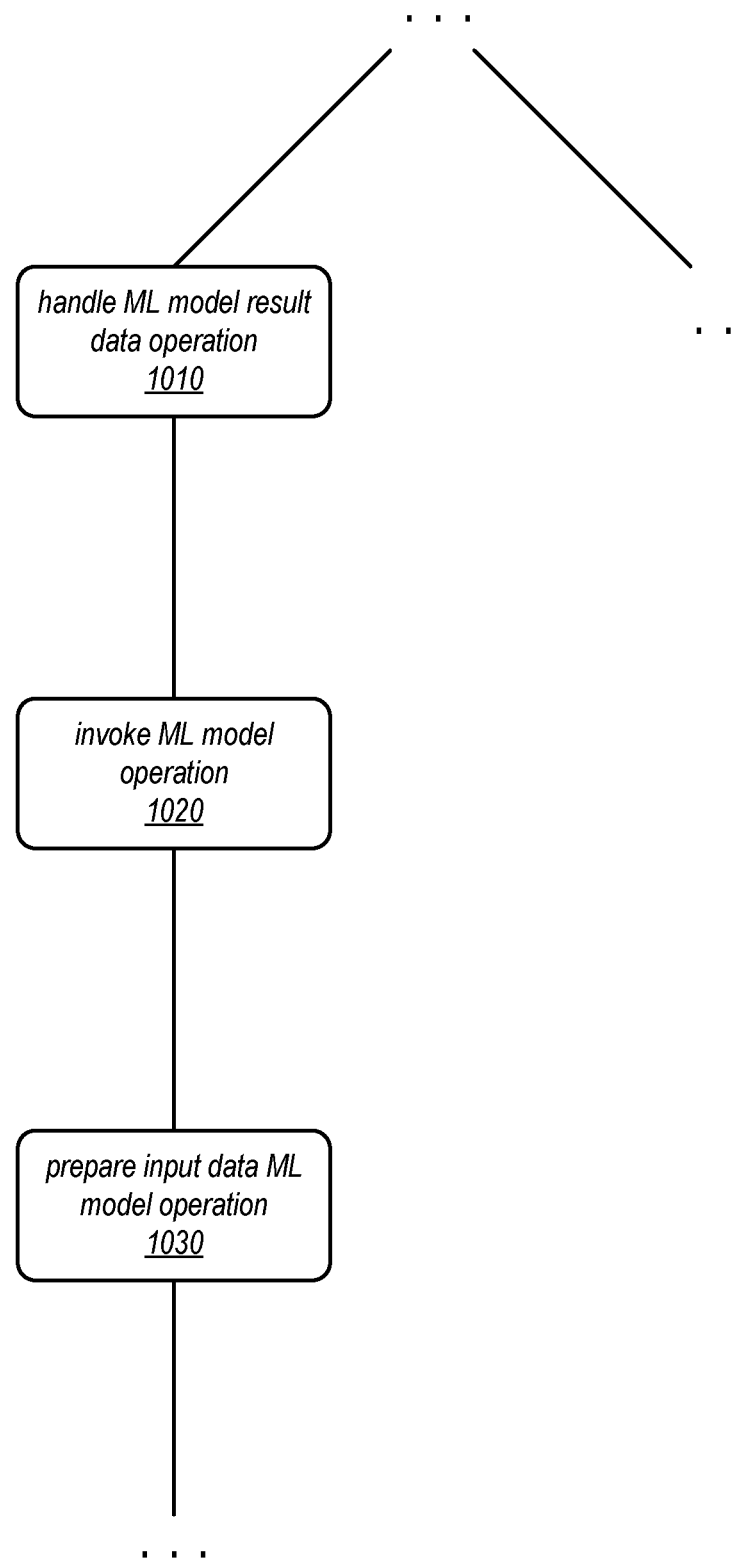
FIG. 10 is a logical illustration of an example query plan that includes operations to prepare database data for machine learning model operations and handle machine learning model results, according to some embodiments.

FIG. 10 is a logical illustration of an example query plan that includes operations to prepare database data for machine learning model operations and handle machine learning model results, according to some embodiments. As discussed above with regard to FIG. 9, query planning may include operations to handle various aspects of incorporating an ML model into a database query. For example, as indicated at 1010, an operation to prepare input data for ML model operation may be included, which may perform various preprocessing operations as discussed above (e.g., transforming the data from one format to another format, scaling data from one numerical range to another numerical range, adding one or more delimiters (e.g., commas) to specify a boundary between the data, reordering the sequence of data, etc.).

The output of operation 1030 may then be directed to operation 1020, which may invoke the ML model. For example, in some embodiments, the database may support a function call from a database engine to initiate execution of the ML model application with the prepared input data. In some embodiments, a query plan may also include an operation to handle ML model result data, such as operation 1010. For example, some data formats or information used by or produced by the ML model may not be supported by the database. Therefore, operation 1010 may perform various transformations or other changes to ready a result for use in subsequent portions of the query plan (e.g., to serve as a filter for values obtained from another table or other query plan operation). Please note that example of a query plan discussed above is not intended to be limiting as various representations and/or arrangements of query plan operations may be implemented in different embodiments.

Although FIGS. 1-10 have been described and illustrated in the context of a provider network implementing different data processing services, like a data warehousing service, the various components illustrated and described in FIGS. 1-10 may be easily applied to other data processing systems that can utilize additional query engines to provide for secondary query performance capacity. As such, FIGS. 1-10 are not intended to be limiting as to other embodiments of dynamically assigning queries to secondary processing resources.

Figure 11:
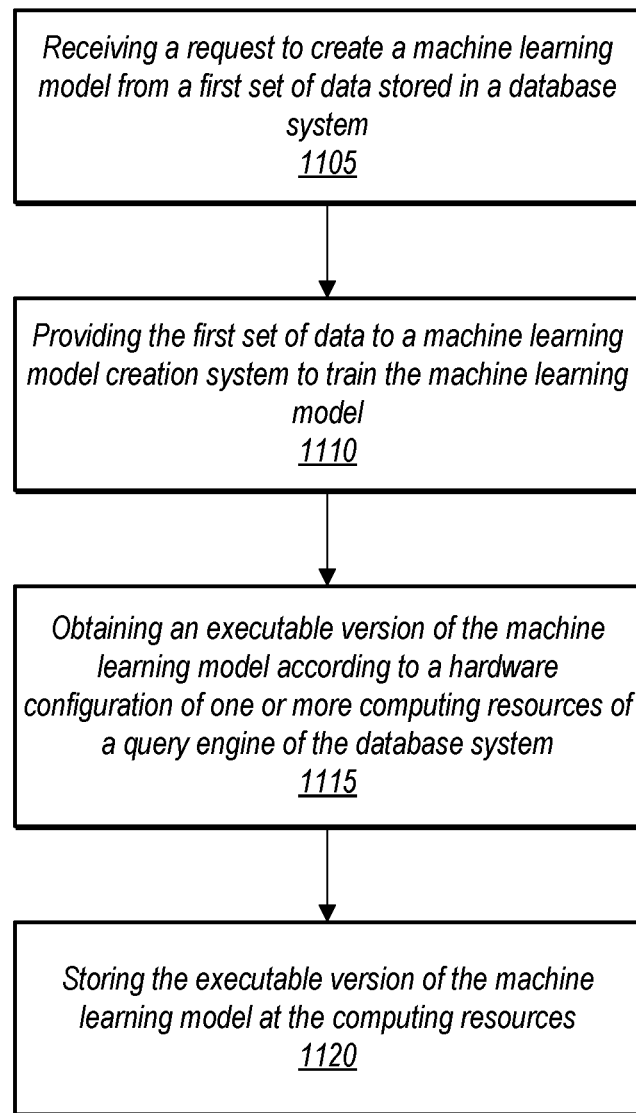
FIG. 11 is a high-level flowchart showing methods and techniques to implement training and dynamic compilation of a machine learning model, according to some embodiments.

FIG. 11 is a high-level flowchart showing methods and techniques to implement training and dynamic compilation of a machine learning model, according to some embodiments. As shown in FIG. 11, in some embodiments, a request may be received to create a machine learning model from a first set of data (e.g., training data) stored in a database system (e.g., the database system and/or data operating service(s) described in FIGS. 1-10), e.g., at a query engine of the database system (e.g., the query engine described above in FIGS. 1-10), as indicated by 1105. In some embodiments, in response to the request, the database system may provide the first set of data to a machine learning model creation system (e.g., the machine learning model creation system and/or service described in FIGS. 1-3) to train the machine learning model, as indicated by 1110. As described above, the query engine may use a delegated worker (e.g., delegated worker 325) to be responsible for coordinating with the machine learning model creation system for training of the machine learning model.

In addition, as described above, in some embodiments, the database system may first provide the first set of data or a copy of the first set of data to an external data storage system (e.g., the data storage system and/or data storage service(s) described in FIGS. 1-3), and the machine learning model creation system may then obtain the first set of data from the external data storage system. In some embodiments, after training, the machine learning model creation system may generate an uncompiled, hardware agnostic version of the machine learning model. In some embodiments, the machine learning model creation system may compile the uncompiled, hardware agnostic version of the machine learning model dynamically according to a hardware configuration of one or more computing resources selected by the database system to implement the query engine to perform requests to the database system. In some embodiments, the database system may obtain the executable version of the machine learning model, as indicated by 1115. As described above, in some embodiments, the machine learning model creation system may first send the executable version, and optionally also the uncompiled version, of the machine learning model to the external data storage system, and the database system may then obtain them from the external data storage system. In some embodiments, the database system may store the executable version of the machine learning model at the selected one or more computing resources of the query engine, as indicated by 1120.

Figure 12:
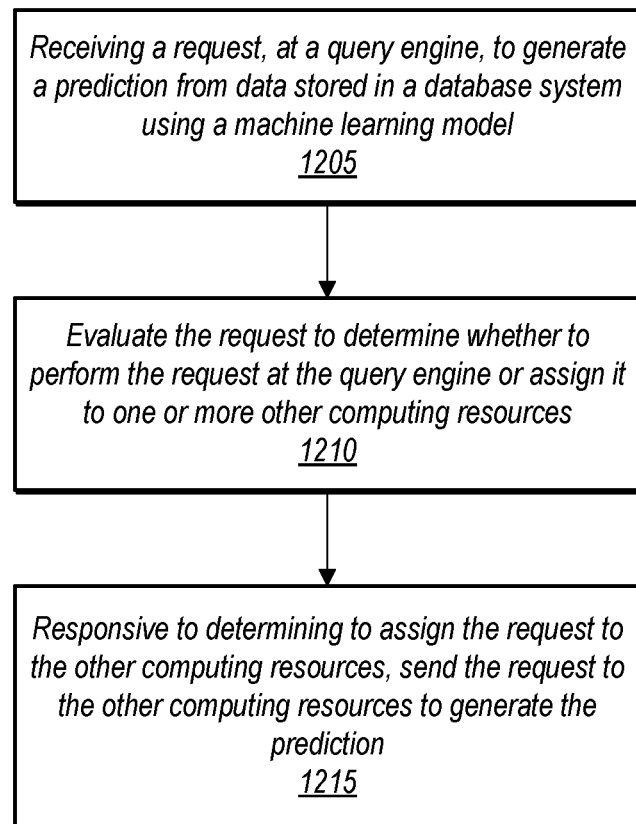
FIG. 12 is a high-level flowchart showing methods and techniques to implement deployment or testing of a machine learning model with concurrency scaling, according to some embodiments.

FIG. 12 is a high-level flowchart showing methods and techniques to implement deployment or testing of a machine learning model with concurrency scaling, according to some embodiments. As shown in FIG. 12, in some embodiments, a request may be received to generate a prediction from data (e.g., testing data) stored in a database system (e.g., the database system and/or data operating service(s) described in FIGS. 1-10) using a machine learning model, e.g., at a query engine of the database system (e.g., the query engine described above in FIGS. 1-10), as indicated by 1205. As described above, in some embodiments, the query engine may be a cluster of one or more computing resources (e.g., the primary processing cluster described above in FIG. 5). The query engine may include a leader node (e.g., the leader node described above in FIGS. 1-10) which may include a workload manager (e.g., the workload manager described above in FIGS. 4 and 9) to implement concurrency scaling for workload balance. In some embodiments, the query engine (e.g., using the workload manager of the leader node) may evaluate the request to determine whether to perform the request at the query engine or assign it to one or more other computing resources distinct from the query engine, as indicated by 1210. As described above, the other computing resources may include a secondary query engine (e.g., a secondary processing cluster described above in FIGS. 4 and 6) provisioned on-demand by the database system (e.g., as described above in FIG. 7) or a machine learning model creation system (e.g., the machine learning model creation system and/or service described in FIGS. 1-3). In some embodiments, responsive to determining to assign the request to the other computing resources, the query engine may send the request to the other computing resources to begin performing the request to generate the prediction, as indicated by 1215.

Figure 13:
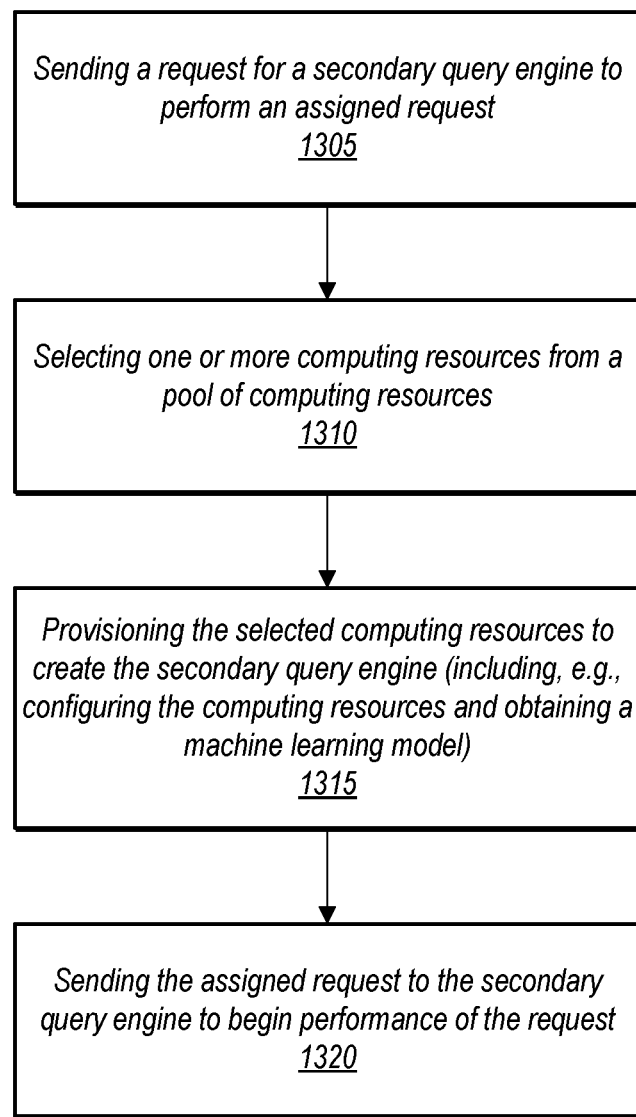
FIG. 13 is a high-level flowchart showing methods and techniques to implement on-demand provisioning of a secondary query engine, according to some embodiments.

FIG. 13 is a high-level flowchart showing methods and techniques to implement on-demand provisioning of a secondary query engine, according to some embodiments. As described above, in some embodiments, a query engine of a database system (e.g., the primary processing cluster described above in FIG. 5) may evaluate a request received for generating a prediction from data stored in the database system with a machine learning model to determine whether to assign the request to a secondary query engine (e.g., the secondary processing cluster described above in FIG. 6). As described in FIG. 7, responsive to determining to assign the request to the secondary query engine, the query engine may send a request to the database system (e.g., through control plane 715 of the database system) to create the secondary query engine on-demand, as indicated by 1305. In some embodiments, the database system (e.g., through control plane 715) may select one or more computing resources from a pool of computing resources, as indicated by 1310. In some embodiments, the database system (e.g., through control plane 715) may provision the selected computing resources to create the secondary query engine, as indicated by 1315. In some embodiments, the provisioning of the computing resources may include configuring the selected computing resources, installing necessary operating systems and/or software, and obtaining and storing an executable version of the machine learning model at the selected computing resources. In some embodiments, the executable version of the machine learning model may be created from an uncompiled, hardware agnostic version of the machine learning model according to the hardware configuration of the selected computing resources. In some embodiments, once provisioned, the database system (e.g., through control plane 715) may identify the secondary query engine to the query engine (e.g., by providing a network endpoint for the secondary query engine), and the query engine may thus send the assigned request to the provisioned secondary query engine to begin performance of the request, as indicated by 1320.

Figure 14:
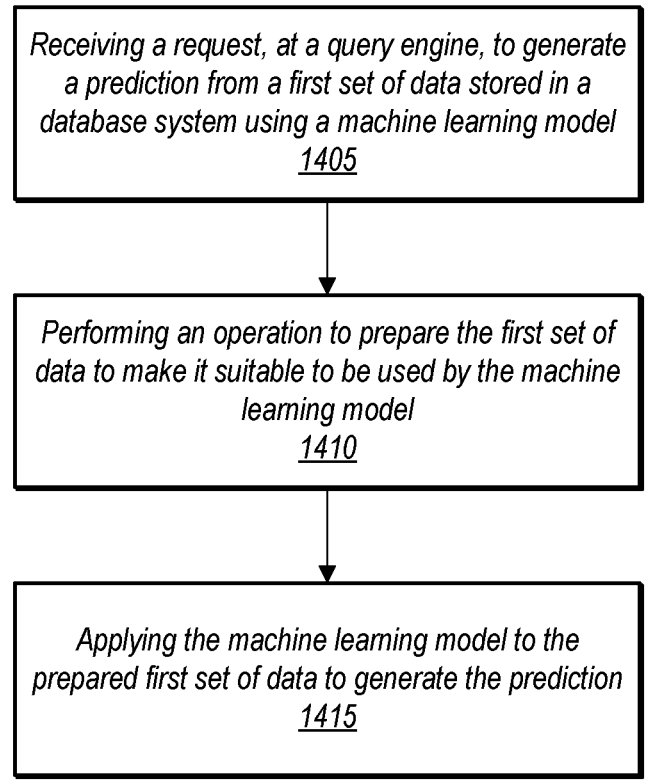
FIG. 14 is a high-level flowchart showing methods and techniques to implement deployment or testing of a machine learning model with data preprocessing operations at a database system, according to some embodiments.

FIG. 14 is a high-level flowchart showing methods and techniques to implement deployment or testing of a machine learning model with data preprocessing operations at a database system, according to some embodiments. As shown in FIG. 14, in some embodiments a request may be received to generate a prediction from a first set of data (e.g., testing data) stored in a database system (e.g., the database system and/or data operating service(s) described in FIGS. 1-10) using a machine learning model, e.g., at a query engine of the database system (e.g., the query engine described above in FIGS. 1-10), as indicated by 1405. As described above, in some embodiments, the testing of the machine learning model may require various preprocessing operations to prepare the first set of data to make it suitable to be used by the machine learning model. For instance, the preprocessing operations may transform some of the data from one format to another, scale some of the data from one range to another, adding one or more delimiters to specify a boundary between some of the data, reorder the sequence for some of the data, and the like. In some embodiments, the preprocessing operations may be stored at individual ones of the computing resources of the query engine (e.g., each computing resource may include the code for the preprocessing operations). Accordingly, responsive to the request received for generating the prediction, the computing resources of the query engine my obtain the first set of data from the database system and perform the preprocessing operations to prepare the first set of data, as indicated by 1410. In some embodiments, the query engine may apply the machine learning model to the prepared first set of data to generate the prediction, as indicated by 1415.

As described above in FIG. 5, in some embodiments, the query engine may include a leader node and a cluster of compute nodes, and at least some of the preprocessing operations and/or model application may be performed at the compute node level of the query engine. For instance, the cluster of compute nodes may individually obtain a portion of the first set of data under one or more sub-queries, perform one or more preprocessing operations on the sub-queried data, apply an executable version of the machine learning model stored "locally" at the corresponding compute node to generate intermediate results, and send the intermediate results to the leader node. In some embodiments, the cluster of compute nodes may further perform one or more postprocessing operations corresponding to the preprocessing operations, e.g., to convert the intermediate results back to the original format and/or scale. In some embodiments, the leader node may aggregate the intermediate results from the cluster of compute nodes to provide the final prediction.

Figure 15:
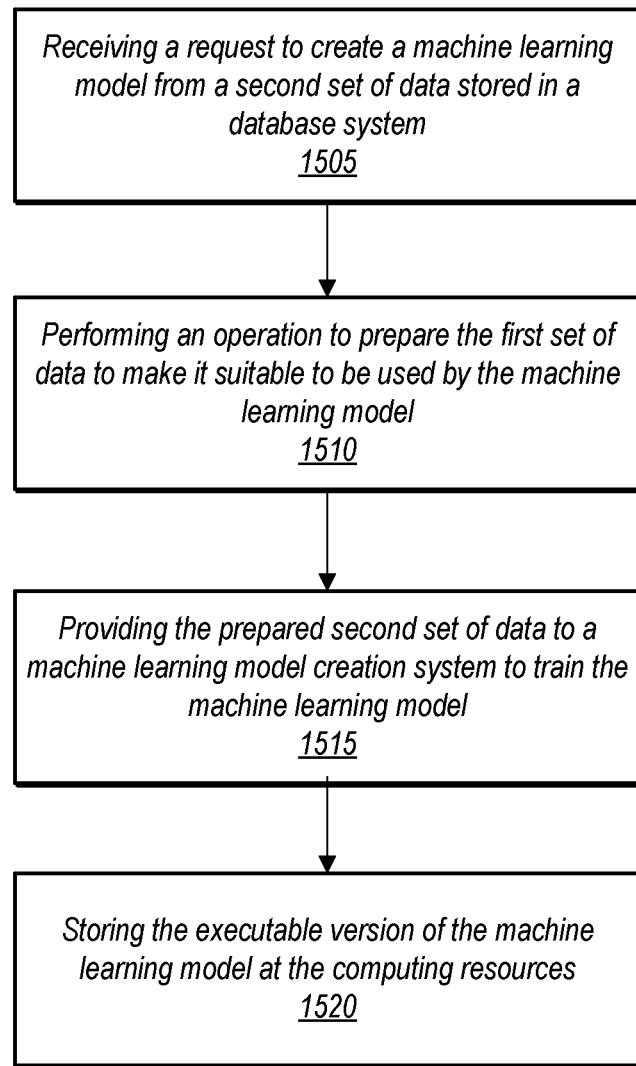
FIG. 15 is a high-level flowchart showing methods and techniques to implement training of a machine learning model with data preprocessing operations at a database system, according to some embodiments.

FIG. 15 is a high-level flowchart showing methods and techniques to implement training of a machine learning model with data preprocessing operations at a database system, according to some embodiments. As shown in FIG. 15, in some embodiments, a request may be received to create a machine learning model from a second set of data (e.g., training data) stored in a database system (e.g., the database system and/or data operating service(s) described in FIGS. 1-10), e.g., at a query engine of the database system (e.g., the query engine described above in FIGS. 1-10), as indicated by 1505. As described above, the training of the machine learning model may require various preprocessing operations to prepare the second set of data to make it suitable for use by the machine learning model. Therefore, in some embodiments, the query engine may obtain the second set of data from the database system and perform the preprocessing operations to prepare the data for testing, as indicated by 1510. Similar to testing of a machine learning model described in FIG. 14, in some embodiments, performance of the preprocessing may be implemented at the compute node level of the query engine. In some embodiments, once prepared, the database system may provide the prepared second set of data to a machine learning model creation system to train a machine learning model (e.g., the machine learning model creation system and/or service described in FIGS. 1-3), as described above, as indicated by 1515. In some embodiments, the machine learning model creation system may create an uncompiled, hardware agnostic version of the machine learning model, and dynamically compile the uncompiled version according to the hardware configuration of the computing resources of the query engine to generate an executable version of the machine learning model. In some embodiments, the database system may obtain and store the executable version of the machine learning model at the computing resources of the query engine, as indicated by 1520.

Figure 16:
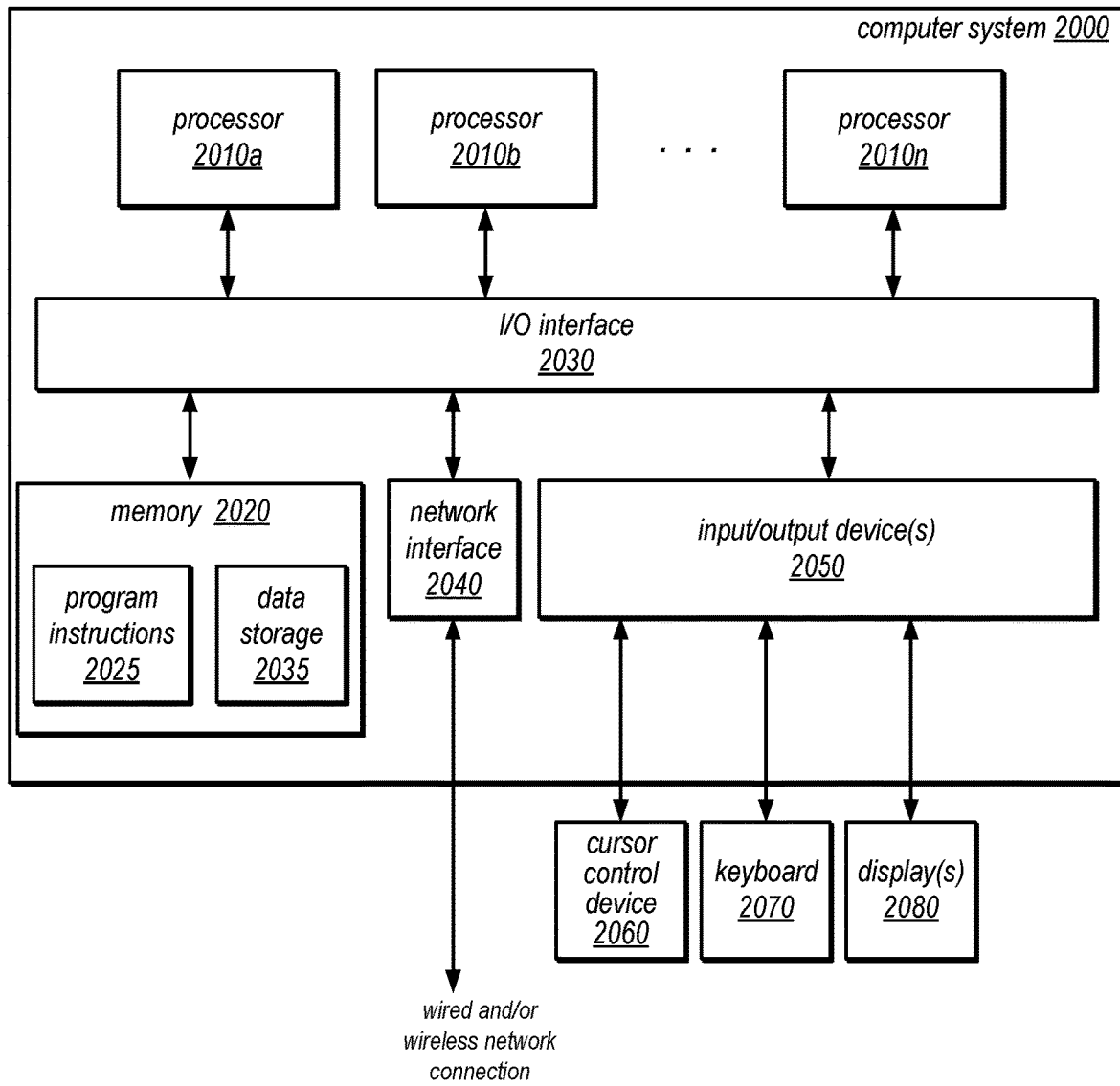
FIG. 16 is a block diagram showing an example computing system to implement the various techniques described herein, according to some embodiments.

FIG. 16 shows an example computing system to implement the various techniques described herein, according to some embodiments. For example, in one embodiment, the above-described database system, machine learning model creation system, and/or external data storage system may be implemented by one or more of a computer system, for instance, a computer system as in FIG. 16 that includes one or more processors executing program instructions stored on a computer-readable storage medium coupled to the processors. In the illustrated embodiment, computer system 2000 includes one or more processors 2010 coupled to a system memory 2020 via an input/output (I/O) interface 2030. Computer system 2000 further includes a network interface 2040 coupled to I/O interface 2030. While FIG. 16 shows computer system 2000 as a single computing device, in various embodiments a computer system 2000 may include one computing device or any number of computing devices configured to work together as a single computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be one embodiment of a computer-accessible medium configured to store instructions and data accessible by processor(s) 2010. In various embodiments, system memory 2020 may be implemented using any non-transitory storage media or memory media, such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040. In the illustrated embodiment, program instructions (e.g., code) and data implementing one or more desired functions, e.g., requests performance (including, e.g., data access and pre-processing, prediction generation with a machine learning model, etc.), machine learning model creation (including, e.g., model building and training, and dynamic compilation, etc.), etc. described above in FIGS. 1-15, are shown stored within system memory 2030 as code 2026 and data 2027.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fiber Channel SANs, or via any other suitable type of network and/or protocol.

In some embodiments, system memory 2020 may be one embodiment of a computer-accessible medium configured to store program instructions and data as described above for FIG. 1-xx. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
   one or more hardware processors and memory configured to implement one or more computing resources of a database system including a query engine that includes one or more of the computing resources of the database system,
   wherein the query engine is configured to:
      receive a statement in a query language supported by the database system that specifies both a predicate to obtain a first set of data stored in the database system and a machine learning model, which causes the database system to determine one or more operations from the statement to generate a prediction for the first set of data stored in the database system using the machine learning model;
      obtain the first set of data from the database system;
      perform an operation to prepare the first set of data for use by the machine learning model to generate the prediction; and
      apply the machine learning model to the prepared first set of data at the one or more computing resources of the query engine to generate the prediction for the first set of data stored in the database system.

2. The system of claim 1, wherein the query engine is further configured to:
   receive, at the query engine of the database system, another statement to create the machine learning model for a second set of data stored in the database system;
   perform the operation to prepare the second set of data for training of the machine learning model;
   provide the prepared second set of data to a machine learning model creation system to train the machine learning model; and
   after the training of the machine learning model, obtain the machine learning model from the machine learning model creation system to store the machine learning model at the one or more computing resources of the query engine.

3. The system of claim 1, wherein the operation performed to prepare the first set of data comprises at least one of (1) transforming at least some of the first set of data from one format to another format, (2) scaling at least some of the first set of data from one range to another range, (3) adding one or more delimiters to specify a boundary between at least some of the first set of data, (4) reordering a sequence of at least some of the first set of data, or (5) sampling the first set of data to create a new set of data for generating the prediction with the machine learning model.

4. The system of claim 1, wherein the database system is a data warehouse service of a provider network.

5. A method, comprising:
   receiving, at a query engine including one or more computing resources of a database system, a statement in a query language supported by the database system that specifies both a predicate to obtain a first set of data stored in the database system and a machine learning model, which causes the database system to determine one or more operations from the statement to generate a prediction for the first set of data stored in the database system using the machine learning model;
   performing, at the one or more computing resources of the query engine, an operation to prepare the first set of data for use by the machine learning model to generate the prediction; and
   applying, at the one or more computing resources of the query engine, the machine learning model to the prepared first set of data to generate the prediction for the first set of data stored in the database system.

6. The method of claim 5, further comprising:
   receiving, at the query engine of the database system, another statement to create the machine learning model for a second set of data stored in the database system;
   performing the operation to prepare the second set of data for training of the machine learning model;
   providing the prepared second set of data to a machine learning model creation system to train the machine learning model; and
   after the training of the machine learning model, obtaining the machine learning model from the machine learning model creation system to store the machine learning model at the one or more computing resources of the query engine.

7. The method of claim 5, wherein the operation performed to prepare the first set of data comprises at least one of (1) transforming at least some of the first set of data from one format to another format, (2) scaling at least some of the first set of data from one range to another range, (3) adding one or more delimiters to specify a boundary between at least some of the first set of data, (4) reordering a sequence of at least some of the first set of data, or (5) sampling the first set of data to create a new set of data for generating the prediction with the machine learning model.

8. The method of claim 5, wherein the operation performed to prepare the first set of data is identified at the query engine based at least in part on a type of the machine learning model specified in the statement.

9. The method of claim 5, wherein the operation performed to prepare the first set of data is specified in the statement.

10. The method of claim 5, further comprising:
    generating a query plan that includes the operation to prepare the first set of data,
    wherein the performance of the operation to prepare the first set of data is implemented according to the query plan.

11. The method of claim 10, further comprising:
    reordering one or more operations in the query plan to remove at least a portion of the first set of data that fails to satisfy a requirement to be used by the machine learning model before applying the machine learning model to generate the prediction for the first set of data stored in the database system.

12. The method of claim 5, further comprising:
performing an operation to one or more results from the application of the machine learning model to the prepared first set of data to generate the prediction,
wherein the operation to the one or more results comprises at least one of (1) transforming at least some of the one or more results from one format to another format, (2) scaling at least some of the one or more results from one range to another range, (3) removing one or more delimiters to specify a boundary between at least some of the one or more results, (4) reordering a sequence of at least some of the first set of data, or (5) sampling the first set of data to create a new set of data for generating the prediction with the machine learning model.

13. The method of claim 5, wherein the database system is a data warehouse service of a provider network.

14. One or more non-transitory computer readable media storing instructions that, when executed on or across one or more processors, cause the one or more processors to implement:
responsive to receiving a statement in a query language supported by a database system via a network interface, wherein the statement specifies both a predicate to obtain a first set of data stored in the database system and a machine learning model, which causes the database system to determine one or more operations from the statement to generate a prediction for the first set of data stored in the database system using the machine learning model,
performing, at one or more computing resources selected out of a plurality of computing resources by the database system to process statements to the database system, an operation to prepare the first set of data for use by the machine learning model to generate the prediction; and
applying the machine learning model to the prepared first set of data at the selected one or more computing resources to generate the prediction for the first set of data stored in the database system.

15. The one or more non-transitory computer readable media of claim 14, wherein the instructions further cause the one or more processors to implement:
receiving another statement to create the machine learning model for a second set of data stored in the database system;
performing the operation to prepare the second set of data for training of the machine learning model;
providing the prepared second set of data to a machine learning model creation system to train the machine learning model; and
after the training of the machine learning model, obtaining the machine learning model from the machine learning model creation system to store the machine learning model in the database system.

16. The one or more non-transitory computer readable media of claim 14, wherein the operation performed to prepare the first set of data comprises at least one of (1) transforming at least some of the first set of data from one format to another format, (2) scaling at least some of the first set of data from one range to another range, (3) adding one or more delimiters to specify a boundary between at least some of the first set of data, or (4) reordering a sequence of at least some of the first set of data.

17. The one or more non-transitory computer readable media of claim 14, wherein the operation performed to prepare the first set of data is identified at the query engine based at least in part on a type of the machine learning model specified in the statement.

18. The one or more non-transitory computer readable media of claim 14, wherein the operation performed to prepare the first set of data is specified in the statement.

19. The one or more non-transitory computer readable media of claim 14, wherein the instructions further cause the one or more processors to implement:
generating a query plan that includes the operation to prepare the first set of data,
wherein the performance of the operation to prepare the first set of data is implemented according to the query plan.

20. The one or more non-transitory computer readable media of claim 19, wherein the instructions further cause the one or more processors to implement:
reordering one or more operations in the query plan to remove at least a portion of the first set of data that fails to satisfy a requirement to be used by the machine learning model before applying the machine learning model to generate the prediction for the first set of data stored in the database system.

* * * * *